United States Patent
Mola

(10) Patent No.: US 10,324,851 B2
(45) Date of Patent: Jun. 18, 2019

(54) FACILITATING RECORDING A TRACE FILE OF CODE EXECUTION USING WAY-LOCKING IN A SET-ASSOCIATIVE PROCESSOR CACHE

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 26 days.

(21) Appl. No.: 15/433,918

(22) Filed: Feb. 15, 2017

(65) Prior Publication Data

US 2018/0113809 A1    Apr. 26, 2018

Related U.S. Application Data

(63) Continuation-in-part of application No. 15/298,439, filed on Oct. 20, 2016.

(51) Int. Cl.
*G06F 12/08* (2016.01)
*G06F 12/0864* (2016.01)
(Continued)

(52) U.S. Cl.
CPC ......... *G06F 12/0864* (2013.01); *G06F 11/34* (2013.01); *G06F 11/36* (2013.01);
(Continued)

(58) Field of Classification Search
CPC ............ G06F 12/0864; G06F 12/0842; G06F 12/126; G06F 11/36; G06F 11/34;
(Continued)

(56) References Cited

U.S. PATENT DOCUMENTS 4,598,364 A    7/1986 Gum et al.
5,381,533 A    1/1995 Peleg et al.
(Continued)

OTHER PUBLICATIONS

""""7 Recording Inferior's Execution and Replaying It"""", Published on: Nov. 18, 2012Available at:https://sourceware.org/gdb/onlinedocs/gdb/Process-Record-and-Replay.html".
(Continued)

*Primary Examiner* — Hiep T Nguyen
(74) *Attorney, Agent, or Firm* — Workman Nydegger

(57) ABSTRACT

Facilitating recording a trace of code execution using way-locking in a set-associative processor cache. A computing device reserves cache line(s) in set(s) of cache lines of a set-associative cache for caching only locations in the system memory that are allocated to a particular executable entity. During a traced execution of the particular executable entity, the computing device detects that a cache miss has occurred on a location in the system memory that is allocated to a particular executable entity, and that a value at the location of system memory is being cached into one of the reserved cache lines. Based on the value at the location of system memory being cached into a reserved cache line, the computing device logs into a trace data stream at least a portion of the value at the location of system memory being cached into the reserved cache line.

20 Claims, 11 Drawing Sheets

(51) Int. Cl.
  *G06F 11/36* (2006.01)
  *G06F 12/0842* (2016.01)
  *G06F 11/34* (2006.01)
  *G06F 12/126* (2016.01)
(52) U.S. Cl.
  CPC ........ *G06F 12/0842* (2013.01); *G06F 12/126* (2013.01); *G06F 2201/885* (2013.01); *G06F 2212/1008* (2013.01); *G06F 2212/502* (2013.01)
(58) Field of Classification Search
  CPC ....... G06F 2201/885; G06F 2212/1008; G06F 2212/502
  USPC ....................................................... 711/122
  See application file for complete search history.

(56) References Cited

U.S. PATENT DOCUMENTS

| | | |
|---|---|---|
| 5,893,086 A | 4/1999 | Schmuck et al. |
| 5,905,855 A | 5/1999 | Klaiber et al. |
| 5,944,841 A | 8/1999 | Christie |
| 6,009,270 A | 12/1999 | Mann |
| 6,101,524 A | 6/2000 | Choi et al. |
| 6,094,729 A | 7/2000 | Mann |
| 6,167,536 A | 12/2000 | Mann |
| 6,327,701 B2 | 12/2001 | Ungar |
| 6,351,844 B1 | 2/2002 | Bala |
| 6,480,886 B1 | 11/2002 | Paice |
| 6,502,111 B1 | 12/2002 | Dussud |
| 6,598,179 B1 | 7/2003 | Chirashnya et al. |
| 6,634,011 B1 | 10/2003 | Peltier et al. |
| 6,728,949 B1 | 4/2004 | Bryant et al. |
| 6,772,324 B2 | 8/2004 | Akkary et al. |
| 6,854,108 B1 | 2/2005 | Choi |
| 7,055,070 B1 | 5/2006 | Uhler et al. |
| 7,089,272 B1 | 8/2006 | Garthwaite et al. |
| 7,089,400 B1 | 8/2006 | Pickett et al. |
| 7,150,006 B2 | 12/2006 | Bliss et al. |
| 7,178,133 B1 | 2/2007 | Thekkath |
| 7,181,728 B1 | 2/2007 | Thekkath |
| 7,380,253 B2 | 5/2008 | Yamauchi et al. |
| 7,448,025 B2 | 11/2008 | Kalafatis et al. |
| 7,454,486 B2 | 11/2008 | Kaler et al. |
| 7,478,394 B1 | 1/2009 | De Dinechin |
| 7,620,938 B2 | 11/2009 | Edwards |
| 7,676,632 B2 | 3/2010 | Miller |
| 7,877,630 B1 | 1/2011 | Favor et al. |
| 7,958,497 B1 | 6/2011 | Lindo et al. |
| 7,984,129 B2* | 7/2011 | Vaught .................... H04L 67/20 707/600 |
| 8,010,337 B2 | 8/2011 | Narayanan et al. |
| 8,087,017 B1 | 12/2011 | Whaley |
| 8,296,775 B2 | 10/2012 | Thornton et al. |
| 8,321,842 B2 | 11/2012 | Xu et al. |
| 8,423,965 B2 | 4/2013 | Goel et al. |
| 8,468,501 B2 | 6/2013 | Subhraveti |
| 8,484,516 B2 | 7/2013 | Giannini |
| 8,499,200 B2 | 7/2013 | Cathro |
| 8,499,299 B1 | 7/2013 | Jakab et al. |
| 8,543,988 B2 | 9/2013 | Shimazaki et al. |
| 8,612,650 B1 | 12/2013 | Carrie et al. |
| 8,719,796 B2 | 5/2014 | Rosu et al. |
| 8,769,511 B2 | 7/2014 | Gal |
| 8,826,273 B1 | 9/2014 | Chen |
| 8,832,682 B2 | 9/2014 | Xu et al. |
| 8,839,245 B1 | 9/2014 | Khajuria et al. |
| 9,015,121 B1 | 4/2015 | Salamon et al. |
| 9,015,441 B2 | 4/2015 | Worthington et al. |
| 9,058,415 B1 | 6/2015 | Serebrin et al. |
| 9,164,809 B2 | 10/2015 | Tsirkin |
| 9,268,666 B2 | 2/2016 | Law et al. |
| 9,280,379 B2 | 3/2016 | Tsirkin |
| 9,300,320 B2 | 3/2016 | Ansari et al. |
| 9,329,884 B2 | 5/2016 | Strong et al. |
| 9,361,228 B2 | 6/2016 | Turner et al. |
| 9,535,815 B2 | 1/2017 | Smith et al. |
| 9,569,338 B1 | 2/2017 | Bradbury et al. |
| 9,588,870 B2 | 3/2017 | Marron et al. |
| 9,767,237 B2 | 9/2017 | Suresh et al. |
| 9,875,173 B2 | 1/2018 | Marron et al. |
| 9,934,127 B1* | 4/2018 | Mola ................. G06F 17/30312 |
| 10,031,833 B2 | 7/2018 | Mola |
| 10,031,834 B2 | 7/2018 | Mola |
| 10,042,737 B2 | 8/2018 | Mola |
| 2002/0078124 A1 | 6/2002 | Baylor et al. |
| 2002/0087949 A1 | 7/2002 | Golender et al. |
| 2002/0124237 A1 | 9/2002 | Sprunt et al. |
| 2002/0144101 A1 | 10/2002 | Wang et al. |
| 2003/0079205 A1 | 4/2003 | Miyao et al. |
| 2003/0126508 A1 | 7/2003 | Litt |
| 2003/0233636 A1 | 12/2003 | Crawford |
| 2004/0117690 A1 | 6/2004 | Andersson |
| 2004/0243894 A1 | 12/2004 | Smith |
| 2005/0155019 A1 | 7/2005 | Levine et al. |
| 2005/0223364 A1 | 10/2005 | Peri et al. |
| 2006/0036579 A1 | 2/2006 | Byrd |
| 2006/0112310 A1 | 5/2006 | Mchale et al. |
| 2006/0155791 A1 | 7/2006 | Tene et al. |
| 2006/0230390 A1 | 10/2006 | Alexander et al. |
| 2007/0106287 A1 | 5/2007 | Boatright et al. |
| 2007/0106827 A1 | 5/2007 | Boatright |
| 2007/0130237 A1 | 6/2007 | Altman et al. |
| 2007/0150881 A1 | 6/2007 | Khawand et al. |
| 2007/0168989 A1 | 7/2007 | Edwards et al. |
| 2007/0186055 A1 | 8/2007 | Jacobson et al. |
| 2007/0214342 A1 | 9/2007 | Newburn et al. |
| 2007/0220361 A1 | 9/2007 | Barnum et al. |
| 2008/0065810 A1 | 3/2008 | Spanel et al. |
| 2008/0091867 A1 | 4/2008 | Plondke et al. |
| 2008/0114964 A1 | 5/2008 | Davis et al. |
| 2008/0115113 A1 | 5/2008 | Codrescu et al. |
| 2008/0140935 A1 | 6/2008 | Cypher et al. |
| 2008/0215920 A1 | 9/2008 | Mayer et al. |
| 2008/0243968 A1 | 10/2008 | Schmelter et al. |
| 2008/0250207 A1 | 10/2008 | Davis et al. |
| 2008/0256396 A1 | 10/2008 | Giannini et al. |
| 2008/0270745 A1 | 10/2008 | Saha et al. |
| 2008/0288826 A1 | 11/2008 | Nemoto |
| 2008/0301417 A1 | 12/2008 | Law |
| 2009/0006729 A1 | 1/2009 | Piazza et al. |
| 2009/0007111 A1 | 1/2009 | Nelson et al. |
| 2009/0013133 A1 | 1/2009 | Cypher et al. |
| 2009/0031173 A1 | 1/2009 | Al-omari et al. |
| 2009/0037886 A1 | 2/2009 | McCoy et al. |
| 2009/0106278 A1 | 4/2009 | Ramacher et al. |
| 2009/0119493 A1 | 5/2009 | Venkitachalam et al. |
| 2009/0119665 A1 | 5/2009 | Venkitachalam et al. |
| 2009/0138859 A1* | 5/2009 | Chen .................. G06F 11/3461 717/131 |
| 2009/0144742 A1 | 6/2009 | Subhraveti |
| 2009/0319753 A1 | 12/2009 | Welc et al. |
| 2009/0320011 A1 | 12/2009 | Chen et al. |
| 2010/0005464 A1 | 1/2010 | Malyugin et al. |
| 2010/0106912 A1 | 4/2010 | Cypher et al. |
| 2010/0107158 A1 | 4/2010 | Chen et al. |
| 2010/0138815 A1 | 6/2010 | Schneider |
| 2010/0149188 A1 | 6/2010 | Roseborough et al. |
| 2010/0162247 A1 | 6/2010 | Welc et al. |
| 2010/0205484 A1 | 8/2010 | Dragicevic et al. |
| 2010/0211933 A1 | 8/2010 | Kiel et al. |
| 2010/0223446 A1 | 9/2010 | Katariya et al. |
| 2010/0250856 A1 | 9/2010 | Owen et al. |
| 2010/0251031 A1 | 9/2010 | Nieh et al. |
| 2010/0268995 A1 | 10/2010 | Goodman et al. |
| 2011/0023019 A1 | 1/2011 | Aniszczyk et al. |
| 2011/0029821 A1 | 2/2011 | Chow et al. |
| 2011/0219447 A1 | 9/2011 | Horovitz et al. |
| 2011/0264787 A1 | 10/2011 | Mickens et al. |
| 2011/0271070 A1 | 11/2011 | Worthington et al. |
| 2011/0276761 A1 | 11/2011 | Saha et al. |
| 2011/0288847 A1 | 11/2011 | Narayanan et al. |
| 2011/0296245 A1 | 12/2011 | Alberi et al. |

(56) References Cited

U.S. PATENT DOCUMENTS

| | | |
|---|---|---|
| 2012/0095728 A1 | 4/2012 | Ubukata |
| 2012/0204060 A1 | 8/2012 | Swift et al. |
| 2012/0239987 A1 | 9/2012 | Chow et al. |
| 2012/0246640 A1 | 9/2012 | Marshall et al. |
| 2013/0036403 A1 | 2/2013 | Geist |
| 2013/0086567 A1 | 4/2013 | Inoue et al. |
| 2013/0263114 A1 | 10/2013 | Watkins |
| 2013/0283242 A1 | 10/2013 | Gounares |
| 2013/0318132 A1 | 11/2013 | Basu et al. |
| 2014/0040557 A1 | 2/2014 | Frey et al. |
| 2014/0059523 A1 | 2/2014 | Frazier et al. |
| 2014/0215443 A1 | 7/2014 | Voccio et al. |
| 2014/0281710 A1 | 9/2014 | Cain et al. |
| 2014/0282555 A1 | 9/2014 | Daudel et al. |
| 2014/0331277 A1 | 11/2014 | Frascadore et al. |
| 2014/0366026 A1 | 12/2014 | Ohtake et al. |
| 2014/0372987 A1 | 12/2014 | Strong et al. |
| 2015/0012699 A1 | 1/2015 | Rizzo et al. |
| 2015/0089155 A1 | 3/2015 | Busaba et al. |
| 2015/0089301 A1 | 3/2015 | Laurenti |
| 2015/0319221 A1 | 11/2015 | Zmievski et al. |
| 2015/0355996 A1 | 12/2015 | Smith et al. |
| 2015/0378870 A1 | 12/2015 | Marron et al. |
| 2016/0127307 A1 | 5/2016 | Jain et al. |
| 2016/0154710 A1 | 6/2016 | Wade et al. |
| 2016/0283748 A1 | 9/2016 | Oh et al. |
| 2016/0292061 A1 | 10/2016 | Marron et al. |
| 2017/0052876 A1 | 2/2017 | Svensson et al. |
| 2017/0140082 A1 | 5/2017 | Suresh et al. |
| 2017/0161173 A1 | 6/2017 | Bradbury et al. |
| 2017/0192886 A1 | 7/2017 | Boehm et al. |
| 2017/0286111 A1 | 10/2017 | Pereira et al. |
| 2018/0060213 A1 | 3/2018 | Mola |
| 2018/0060214 A1 | 3/2018 | Mola |
| 2018/0060215 A1 | 3/2018 | Mola |
| 2018/0113788 A1 | 4/2018 | Mola |
| 2018/0113789 A1 | 4/2018 | Mola |
| 2018/0113806 A1 | 4/2018 | Mola |
| 2018/0136869 A1 | 5/2018 | Mola |
| 2018/0285136 A1 | 10/2018 | Mola |
| 2018/0314623 A1 | 11/2018 | Mola |
| 2019/0004930 A1 | 1/2019 | Mola |
| 2019/0018755 A1 | 1/2019 | Mola |

OTHER PUBLICATIONS

""""IntelliTrace"", 2015, Retrieved on: May 26, 2016Available at:https://msdn.microsoft.com/en-us/library/dd264915.aspx".
King, et al., "Debugging operating systems with time-traveling virtual machines", In Proceedings of the USENIX Annual Technical Conference, Apr. 10, 2005, pp. 1-15.
Barr, et al., "TARDIS: Affordable Time-Travel Debugging in Managed Runtimes", In Proceedings of the ACM International Conference on Object Oriented Programming Systems Languages & Applications, Oct. 20, 2014, 16 pages.
"Kleen, Andi, ""Adding Processor Trace support to Linux""", Published on: Jul. 1, 2015Available athttps://lwn.net/Articles/648154/".
""""Elm's Time Traveling Debugger"", Published on: Apr. 16, 2014Available at:http://debug.elm-lang.org/".
Guo, et al., "R2: An Application-Level Kernel for Record and Replay", In Proceedings of the 8th USENIX conference on Operating systems design and implementation, Dec. 8, 2008, 16 pages.
"Sharma, Suchakrapani Datt, ""Hardware Tracing with Intel Processor Trace""", Published on: Dec. 10, 2015Available at:https://hsdm.dorsal.polymtl.ca/system/files/10Dec2015_0.pdf".
Mercer, et al., "Model Checking Machine Code with the GNU Debugger", In Proceedings of 12th International SPIN Workshop, Aug. 22, 2005, 15 pages.
Narayanasamy, et al., "BugNet: Continuously Recording Program Execution for Deterministic Replay Debugging", In Proceedings of the 32nd annual international symposium on Computer Architecture, Jun. 4, 2005, 12 pages.

""""rr: lightweight recording & deterministic debugging"""", Oct. 22, 2015 Available at:http://rr-project.org/".
"Brady, Fiorenza, ""Cambridge University Study States Software Bugs Cost Economy $312 Billion Per Year""", Published on: Jan. 8, 2013Available at:http://www.prweb.com/releases/2013/1/prweb10298185.htm".
"Charles, ""Arun Kishan: Inside Windows 7—Farewell to the Windows Kernel Dispatcher Lock""", Published on: Aug. 6, 2009Available at:https://channel9.msdn.com/shows/Going+Deep/Arun-Kishan-Farewell-to-the-Windows-Kernel-Dispatcher-Lock/".
Xu et al. "ReTrace: Collecting Execution Trace with Virtual Machine Deterministic Replay" In Proceedings of the Third Annual Workshop on Modeling, Benchmarking and Simulation, Jun. 2007, 8 pages.
Tchagou et al. "Reducing Trace Size in Multimedia Applications Endurance Tests" In Proceedings of Design Automation & Test in Europe Conference & Exhibition, Mar. 2015, 2 pages.
Shaaban, et al. "Improving Trace Cache Hit Rates Using the Sliding Window Fill Mechanism and Fill Select Table", In Proceedings of the 2004 workshop on Memory system performance, Jun. 8, 2004, pp. 36-41.
Office Action cited in U.S. Appl. No. 15/349,555 dated Oct. 6, 2017.
Office Action cited in U.S. Appl. No. 15/253,027 dated Oct. 10, 2017.
Hower, et al: "Two hardware-based approaches for deterministic multiprocessor replay", Published Jun. 1, 2009, pp. 93-100.
"International Search Report and the Written Opinion, issued in PCT Application No. PCT/US2017/048094," dated Nov. 10, 2017.
Jiang, et al; CARE: Cache Guided Deterministic Replay for Concurrent Java Program, Published by ACM 2014, pp. 1-11.
Lee, et al; Offline Symbolic Analysis for Multi-Processor Execution Replay, Published by ACM 2009, pp. 564-575.
Office Action cited in U.S. Appl. No. 15/252,998 dated Sep. 20, 2017.
Rivers et al; Utilizing Reuse Information in Data Cache Management, published by ACM 1998, pp. 449-456 (retrieved on Mar. 16, 2018), Retrieved from the Internet <URL:http://delivery.acm.org/10.1145/280000/277941/p449-rivers.pdf?ip=151.207.250.51&id=277941&acc=ACTIVE%20SERVICE&key=C15944E53D0ACA63%2E4D4702B0C3E38B35%2E4D4702B0C3E38B35%2E4D470 . . . >.
Sahuquillo et al; The Filter Cache: A Run-Time Cache Management Approach, Published in: EUROMICRO Conference, 1999. Proceedings. 25th, pp. 1-8 [retrieved on Mar. 16, 2018], Retrieved from the Internet <URL:http://ieeexplore.ieee.org/stamp/stamp.jsp?tp=&arnumber=794504>.
Notice of Allowance cited in U.S. Appl. No. 15/349,555 dated Mar. 29, 2018.
Notice of Allowance cited in U.S. Appl. No. 15/253,027 dated Mar. 21, 2018.
Lai, et al., "A Versatile Data Cache for Trace Buffer Support", In Journal of IEEE Transactions on Circuits and Systems, vol. 61, Issue 11, Nov. 2014, pp. 3145-3154.
Liang, et al., "Improved Procedure Placement for Set Associative Caches", In Proceedings of the International Conference on Compilers, Architectures and Synthesis for Embedded Systems, Oct. 24, 2010, 10 pages.
Liang, et al., "Instruction Cache Locking Using Temporal Reuse Profile", In Proceedings of the 47th Design Automation Conference, Jun. 13, 2010, pp. 344-349.
Uzelac, et al., "Hardware-Based Load Value Trace Filtering for On-the-Fly Debugging", In Journal of ACM Transactions on Embedded Computing Systems, vol. 12, Issue 2s, May 2013, 18 pages.
"Announcing Chronon DVR for Java", Retrieved From : https://www.theserverside.com/discussions/thread/62697.html, Jun. 30, 2014, 5 Pages.
"Better Software Development with Replay Debugging", Retrieved From : http://www.replaydebugging.com, Jun. 30, 2014, 12 Pages.
"Chronon", Retrieved From : http://chrononsystems.com, Dec. 17, 2013., 1 Page.
"Common Compiler Infrastructure", Retrieved From: https://archive.codeplex.com/?p=cciast, Dec. 27, 2012, 1 Page.

(56) References Cited

OTHER PUBLICATIONS

"Common Language Runtime (CLR)", Retrieved From : c, Feb. 2, 2012., 3 Pages.
"Debug Your App by Recording Code Execution with IntelliTrace", Retrieved From : http://msdn.microsoft.com/en-us/library/vstudio/dd264915.aspx, Dec. 17, 2013., 7 Pages.
"GDB: The GNU Project Debugger", Retrieved From : https://www.gnu.org/software/gdb/, Dec. 17, 2013., 2 Pages.
"Interactive Record/Replay for Web Application Debugging", Retrieved from: https://homes.cs.washington.edu/~mernst/pubs/record-replay-uist2013.pdf, Oct. 8, 2013, 11 Pages.
"Monitoring redefined", Retrieved From : https://www.dynatrace.com/blog/tracing-is-the-new-debugging-in-distributed-app-development, Jun. 14, 2017, 14 Pages.
"Postmortem Debugging", Retrieved From : http://my.safaribooksonline.com/book/operating-systems-and-server-administration/microsoft-windows/9780735671348/2dot-debugging-for-fun-and-profit/ch04_html, Dec. 19, 2013., 18 Pages.
"Undo", Retrieved From : http://undo-software.com, Dec. 17, 2013, 2 Pages.
"UndoDB reversible debugging tool for Linux", Retrieved From : http://undo-software.com/product/undodb-overview, Jun. 30, 2014, 2 Pages.
"What is Chronon", Retrieved From : http://chrononsystems.com/what-is-chronon/performance, Jun. 30, 2014, 2 pages.
"Final Office Action Issued in U.S. Appl. No. 14/319,092", dated Oct. 25, 2016, 81 Pages.
"Non-Final Office Action Issued in U.S. Appl. No. 14/319,092", dated Jan. 22, 2016, 53 Pages.
"Non-Final Office Action Issued in U.S. Appl. No. 14/319,092", dated Jun 16, 2017, 99 Pages.
"Notice of Allowance Issued in U.S. Appl. No. 14/319,092", dated Sep. 26, 2017, 6 Pages.
"Non-Final Office Action Issued in U.S. Appl. No. 14/751,638", dated May 17, 2016, 24 Pages.
"Notice of Allowance Issued in U.S. Appl. No. 14/751,638", dated Dec. 6, 2016, 19 Pages.
"Notice of Allowance Issued in U.S. Appl. No. 15/252,998", dated Apr. 27, 2018, 13 Pages.
"Non Final Office Action Issued in U.S. Appl. No. 15/298,439", dated Aug. 13, 2018, 8 Pages.
"Non Final Office Action Issued in U.S. Appl. No. 15/488,282", dated Oct. 19, 2018, 16 Pages.
"Notice of Allowance Issued in U.S. Appl. No. 15/637,376", dated Sep. 12, 2018, 9 Pages.
"Notice of Allowance Issued in U.S. Appl. No. 15/637,376", dated Jun 14, 2018, 16 Pages.
Agrawal, et al."Debugging with Dynamic Slicing and Backtracking", In Journal Software Practice & Experience, vol. 23, Issue 6, Jun. 1993., 28 Pages.
Agrawal, et al."Dynamic Program Slicing", in Proceedings of the ACM SIGPLAN Conference on Programming language Design and Implementation, Jun. 20, 1990., 11 Pages.
Akgul, et al."A Fast Assembly Level Reverse Execution Method via Dynamic Slicing", In Proceedings of the 26th International Conference on Software Engineering, May 23, 2004., 10 Pages.
Bao, et al."Towards a Reversible BPEL Debugger", In Proceedings of IEEE International Conference on Web Services, Sep. 23, 2008., 2 Pages.
Basu, et al."Karma: Scalable Deterministic Record-Replay", In ICS '11 Proceedings of the international conference on Supercomputing, Jun. 1, 2018, pp. 359-368.
Bhansali, et al."Framework for Instruction-level Tracing and Analysis of Program Executions", In Proceedings of the 2nd international conference on Virtual execution environments, Jun. 14, 2006, pp. 154-163.
Blackburn, et al."Barriers: Friend or Foe", In Proceedings of 4th International Symposium on Memory Management, Oct. 24, 2004., 9 Pages.

Blackburn, et al."Immix: A Mark-Region Garbage Collector with Space Efficiency, Fast Collection, and Mutator Performance", Retrieved From : http://users.cecs.anu.edu.au/-steveb/pubs/papers/immix-pldi-2008.pdf, 2008, 11 pages.
Blackburn, et al."Myths and Realities: The Performance Impact of Garbage Collection", In Proceedings of the Joint International Conference on Measurement and Modeling of Computer Systems, Jun. 12, 2004, 12 Pages.
Bond, et al."OCTET: Capturing and Controlling Cross-Thread Dependences Efficiently", In Proceedings of ACM SIGPLAN International Conference on Object Oriented Programming Systems Languages & Applications, Oct. 29, 2013, 20 Pages.
Boothe, Bob "Efficient Algorithms for Bidirectional Debugging", In Proceedings of the ACM SIGPLAN Conference on Programming Language Design and Implementation, Aug. 1, 2000, pp. 299-310.
Brook, et al."Reversible Debugging", In White Paper of Mentor Graphics, Jul. 3, 2009, 11 Pages.
Burg, et al."Interactive Record/Replay for Web Application Debugging", In Proceedings of the 26th annual ACM Symposium on User Interface Software and Technology, Oct. 8, 2013, 11 pages.
Burtsev, et al."Time-Travel for Closed Distributed Systems", In Proceedings of Third Symposium on Networked Systems Design and Implementation, May 2006, 16 Pages.
Caballero"Undangle: Early Detection of Dangling Pointers in Use-After-Free and Double-Free Vulnerabilities", In Proceedings of International Symposium on Software Testing and Analysis, Jul. 15, 2012., 11 Pages.
Clark, et al."Live Migration of Virtual Machines", In Proceedings of 2nd Conference on Symposium on Networked Systems Design & Implementation, vol. 2., May 2, 2005., 14 Pages.
Deva, Prashant "Time inside a Time Travelling Debugger", Retrieved From : http://java.dzone.com/articles/time-inside-time-travelling, May 30, 2011., 3 Pages.
Dimitrov, et al."Time-Ordered Event Traces: A New Debugging Primitive for Concurrency Bugs", In Proceedings of IEEE International Parallel & Distributed Processing Symposium (IPDPS), May 16, 2011, 11 Pages.
Driscoll, et al."Making Data Structures Persistent", In Journal of Computer and System Sciences, vol. 38, No. 1, Feb. 1989, 39 Pages.
Feldman, et al."IGOR: A System for Program Debugging via Reversible Execution", In Proceedings of ACM SIGPLAN and SIGOPS Workshop on Parallel and Distributed Debugging, May 5, 1988., 12 Pages.
Giuffrida"Back to the Future: Fault-tolerant Live Update with Time-traveling State Transfer", In Proceedings of the 27th international conference on Large Installation System Administration, Nov. 3, 2013., 16 Pages.
Goldsmith, et al."Relational Queries over Program Traces", In Proceedings of 20th Annual ACM SIGPLAN Conference on Object-Oriented Programming, Systems, Languages, and Applications, Oct. 16, 2005, 18 Pages.
Grabner, Andreas"Tracing is the new Debugging in Distributed App Development", Retrieved From : https://www.dynatrace.com/blog/tracing-is-the-new-debugging-in-distributed-app-development, Dec. 13, 2016, 14 Pages.
Grizzard, Julian B.., et al."Analysis of Virtual Machine Record and Replay for Trustworthy Computing", Johns Hopkins APL Technical Digest, vol. 32, No. 2. 2013, 2013, 8 Pages.
Gu, et al."Reusing Debugging Knowledge via Trace-based Bug Search", In Proceedings of ACM International Conference on Object Oriented Programming Systems Languages and Applications, Oct. 19, 2012, 16 Pages.
Head, et al."Debugging through Time with the Tralfamadore Debugger", In Proceedings of Runtime Environments, Systems, Layering and Virtualized Environments, Mar., 3, 2012, 8 Pages.
Holzle, et al. "Debugging Optimized Code with Dynamic Deoptimization", In Proceedings of ACM SIGPLAN Conference on Programming Language Design and Implementation, Jun. 17, 1992, 12 Pages.
Hunt, et al. "Singularity: Rethinking the Software Stack", In ACM SIGOPS Operating Systems Review—Systems work at Microsoft Research vol. 41, Issue 2., Apr. 2007, 13 pages.

(56) References Cited

OTHER PUBLICATIONS

Jiang, et al. "Context-Aware Statistical Debugging: From Bug Predictors to Faulty Control Flow Paths", In Proceedings of 22nd IEEE/ACM International Conference on Automated Software Engineering, Nov. 5, 2007, 10 Pages.
K., Nance, et al. "Virtual Machine Introspection: Observation or Interference?", In proceedings of IEEE Security & Privacy Volume: 6, Issue: 5, Sep. 1, 2008, 2 Pages.
Khoo, et al. "Expositor: Scriptable Time-Travel Debugging with First-Class Traces", In Proceedings of the International Conference on Software Engineering, May 18, 2013, pp. 352-361.
Ko, et al. "Debugging Reinvented: Asking and Answering Why and Why Not Questions about Program Behaviour", In Proceedings of 30th International Conference on Software Engineering, May 10, 2008, 10 Pages.
Koju, et al. "An Efficient and Generic Reversible Debugger using the Virtual Machine based Approach", In Proceedings of 1st International Conference on Virtual Execution Environments, Jun. 11, 2005, 10 Pages.
Lee, et al. "Debug All Your Code: Portable Mixed-Environment Debugging", In Proceedings of 24th ACM SIGPLAN Conference on Object Oriented Programming Systems Languages and Applications, Oct. 25, 2009, 19 Pages.
Lee, et al. "Offline Symbolic Analysis for Multi-Processor Execution Replay", In Proceedings of the 42nd Annual IEEE/ACM International Symposium on Microarchitecture, Dec. 12, 2009, pp. 564-575.
Lewis, Bil"Debugging Backwards in Time", In Proceedings of 5th International Workshop on Automated and Algorithmic Debugging, Oct. 9, 2003, 11 Pages.
Lienhard, et al. "Practical Object-Oriented Back-in-Time Debugging", In Proceedings of 22nd European conference on Object-Oriented Programming, Jul. 7, 2008, 25 Pages.
Liu, et al. "WiDS Checker: Combating Bugs in Distributed Systems", In Proceedings of the 4th USENIX conference on Networked systems design & implementation,, Apr. 11, 2007, 14 Pages.
Lo, et al. "Imagen: Runtime Migration of Browser Sessions for JavaScript Web Applications", In Proceedings of 22nd International Conference on World Wide Web, May 13, 2013, 11 Pages.
Mickens, et al. "Mugshot: Deterministic Capture and Replay for JavaScript Applications", In Proceedings of 7th US EN IX Symposium on Networked Systems Design and Implementation, Apr. 28, 2010, 15 Pages.
Nielsen, Jakob "Usability Engineering", Retrieved From : http://www2.engr.arizona.edu/~ece596c/lysecky/uploads/Main/Lec9.pdf, Dec. 17, 2013, 23 Pages.
Pavel, Dovgalyuk "Deterministic Replay of System's Execution with Multi-target QEMU Simulator for Dynamic Analysis and Reverse Debugging, 2012", Retrieved From : https://pdfs.semanticscholar.org/259f/f151c4f79cdc5ec593bec29650c9643c6043.pdf, Mar. 30, 2012, 4 Pages.
"International Search Report & Written Opinion for PCT Patent Application No. PCT/US18/024233", dated Sep. 4, 2018, 16 Pages.
"International Search Report & Written Opinion Issued in PCT Application No. PCT/US2017/060075", dated Feb. 28, 2018, 11 Pages.
Plank, et al. "Libckpt: Transparent Checkpointing under Unix", In Proceedings of the US EN IX Technical Conference Proceedings, Jan. 16, 1995, 13 Pages.
Pluquet, et al. "Executing Code in the Past: Efficient In-MemoryObject Graph Versioning", In Proceedings of 24th ACM SIGPLAN Conference on Object Oriented Programming Systems Languages and Applications, Oct. 25, 2009, 17 Pages.
Porter, et al. "Rethinking the Library OS from the Top Down", In Proceedings of 16th International Conference on Architectural Support for Programming Languages and Operating Systems, Mar. 5, 2011, 14 Pages.
Pothier, et al. "Scalable Omniscient Debugging", In Proceedings of 22nd Annual ACM SIGPLAN Conference on Object-Oriented Programming Systems and Applications, Oct. 21, 2007, 17 Pages.
Reichenbach, et al. "What Can the GC Compute Efficiently? A Language for Heap Assertions at GC Time", In Companion to 25th Annual ACM SIGPLAN Conference on Object-Oriented Programming, Systems, Languages, and Applications, Oct. 17, 2010, 14 Pages.
Rister, et al. "Integrated Debugging of Large Modular Robot Ensembles", In Proceedings of IEEE International Conference on Robotics and Automation, Apr. 10, 2007, 8 Pages.
Ryu, et al. "Source-Level Debugging for Multiple Languages with Modest Programming Effort", In Proceedings of the 14th International Conference on Compiler Construction, Apr. 4, 2005, 21 Pages.
Sartor, et al. "No Bit Left Behind: The Limits of Heap Data Compression", In Proceedings of 7th International Symposium on Memory Management, Jun. 7, 2008, 10 Pages.
Ta-Shma, et al. "Virtual Machine Time Travel Using Continuous Data Protection and Checkpointing", In Proceedings of ACM SIGOPS Operating Systems Review, vol. 42, Issue 1, Jan. 2008, 8 Pages.
Thane, et al. "Replay Debugging of Real-Time Systems Using Time Machines", In Proceedings of International Parallel and Distributed Processing Symposium, Apr. 22, 2003, 8 Pages.
Visan, et al. "Temporal Debugging: Automating Time Travel Debugging with URDB", Retrieved From : http://www.ccs.neu.edu/home/xindong/oopsla10.pdf, Mar. 26, 2010, 12 Pages.
Visan, et al. "URDB: A Universal Reversible Debugger Based on Decomposing Debugging Histories", In Proceedings of 6th Workshop on Programming Languages and Operating Systems, Oct. 23, 2011, 5 Pages.
Wilson, et al. "Demonic Memories for Process Histories", In Proceedings of ACM SIGPLAN Conference on Programming language Design and Implementation, Jun. 21, 1989, 14 Pages.
Zilles, Craig B, et al."Benchmark Health Considered Harmful", In Proceedings of ACM SIGARCH Computer Architecture News, vol. 29, Issue 3, Jun. 2001, 2 Pages.
"Notice of Allowance Issued in U.S. Appl. No. 15/604,334", dated Jan. 3, 2019, 9 pages.
Hicks, et al., "Debugging Heterogeneous Applications with Pangaea", In Proceedings of the SIGMETRICS Symposium on Parallel and Distributed Tools, Jan. 1, 1996, pp. 41-50.
"International Search Report and Written Opinion Issued in PCT Application No. PCT/US2018/033997", dated Dec. 6, 2018, 15 Pages.
"Non Final Office Action Issued in U.S. Appl. No. 15/604,408", dated Jan. 18, 2019, 22 Pages.
"Notice of Allowance Issued in U.S. Appl. No. 15/488,282", dated Feb. 14, 2019, 11 Pages.

* cited by examiner

|  | Address | Value | |
|---|---|---|---|
|  |  |  | 400c |
|  |  |  |  |
|  |  |  |  |
|  |  |  |  |
|  |  |  |  |
| Reserved Cache Line(s) 403c | 00 + 00 − 0 : 0000 | | |
|  | 00 + 00 − 0 : 0000 | | |

*Figure 4C*

|  | Address | Value | |
|---|---|---|---|
|  |  |  | 400d |
|  |  |  |  |
|  |  |  |  |
|  |  |  |  |
|  |  |  |  |
| Reserved Cache Line(s) 403d | 00 - 00 - 00 - 00 | | 404 |
|  | P0 Ref Bits | | 405 |
|  | P1 Ref Bits | | |

*Figure 4D*

FACILITATING RECORDING A TRACE FILE OF CODE EXECUTION USING WAY-LOCKING IN A SET-ASSOCIATIVE PROCESSOR CACHE

CROSS REFERENCE TO RELATED APPLICATIONS

This application is a continuation-in-part of U.S. patent application Ser. No. 15/298,439, filed Oct. 20, 2016, and titled "FACILITATING RECORDING A TRACE FILE OF CODE EXECUTION USING A PROCESSOR CACHE," which application is related to U.S. patent application Ser. No. 15/252,998 filed Aug. 31, 2016, and U.S. patent application Ser. No. 15/253,027 filed Aug. 31, 2016. The entire contents of each of the foregoing applications are incorporated by reference herein in their entireties.

BACKGROUND

When writing code during the development of software applications, developers commonly spend a significant amount of time "debugging" the code to find runtime errors in the code. For example, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. Many such tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" in code (which, when reached during execution, causes execution of the code to be suspended), among other things.

An emerging form of debugging applications enable "time travel," "reverse," or "historic" debugging, in which execution of a program is recorded by a trace application into one or more trace files, which can be then be used to replay execution of the program for forward and backward analysis. One factor that can limit a "time travel" debugger's utility, is trace file size. For example, a large trace file can consume significant storage resources (which, in turn, can affect an amount of historical execution time that can be kept for a program), can affect performance of both a tracing application and a debugging application, can affect performance of the program being traced, etc.

BRIEF SUMMARY

At least some embodiments described herein relate to systems, methods, and computer program products related to recording a trace file of code execution based on use of way-locking on a set-associative processor cache. In particular, embodiments include way-locking a subset of a set-associative processor cache, such that the subset is used exclusively to store cache misses for a specified executable entity (e.g., a thread that is being traced). Since, due to the way-locking, no data relating to other executable entities can be stored in the reserved subset of the cache, logging execution of the executable entity—including all memory consumed by the executable entity—involves logging the data that is stored in the reserved subset of the cache.

One or more embodiments are directed to methods, systems, and computer program products relating to a computing device that facilitates recording a trace of code execution using a set-associative processor cache. The computing device comprises one or more processing units associated with at least one set-associative processor cache that includes a plurality of sets of cache lines, in which each set comprise two or more different cache lines. The computing device reserves one or more cache lines in one or more of the plurality of sets of cache lines for caching only locations in system memory that are allocated to a particular executable entity. During a traced execution of the particular executable entity, the computing device detects that a cache miss has occurred on a location in the system memory that is allocated to a particular executable entity, and that a value at the location of system memory has been, or is to be, cached into one of the reserved cache lines. Based at least on the value at the location of system memory being cached into one of the reserved cache lines, the computing device logs into a trace data stream at least a portion of the value at the location of system memory being cached into the one of the reserved cache lines.

One or more embodiments are directed to methods, systems, and computer program products relating to a computing device that includes one or more processing units and a processor cache that includes a plurality cache lines. The computing device also includes stored control logic that is configured to group the plurality cache lines into a plurality of sets of cache lines, in which each set comprises two or more different cache lines. The stored control logic is also configured to, based upon a request, lock one or more cache lines in one or more of the plurality of sets of cache lines for caching only locations in system memory that are identified based upon a memory address associated with a traced executable entity. The stored control logic is also configured to detect a cache miss on a particular location in the system memory that is identified based upon the memory address associated with the traced executable entity. As a result of detecting the cache miss, the stored control logic is also configured to cache a value at the particular location in the system memory and initiate logging of the value at the particular location in the system memory into a log file associated with tracing of the traced executable entity.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4C illustrates an example shared cache in which accounting bits for two or more cache lines are stored in a reserved cache line, and in which a set of reference value bits are used in connection with multiple sets of unit bits;

FIG. 4D illustrates an example shared cache which uses a reserved cache line to store unit bits and, for each reserved cache line that stores unit bits, uses a separate cache line for each processor to store reference values for that processor;

DETAILED DESCRIPTION

At least some embodiments described herein relate to systems, methods, and computer program products related to recording a trace file of code execution based on use of way-locking on a set-associative processor cache. In particular, embodiments include way-locking a subset of a set-associative processor cache, such that the subset is used exclusively to store cache misses for a specified executable entity (e.g., a thread that is being traced). Since, due to the way-locking, no data relating to other executable entities can be stored in the reserved subset of the cache, logging execution of the executable entity—including all memory consumed by the executable entity—involves logging the data that is stored in the reserved subset of the cache.

Figure 1:
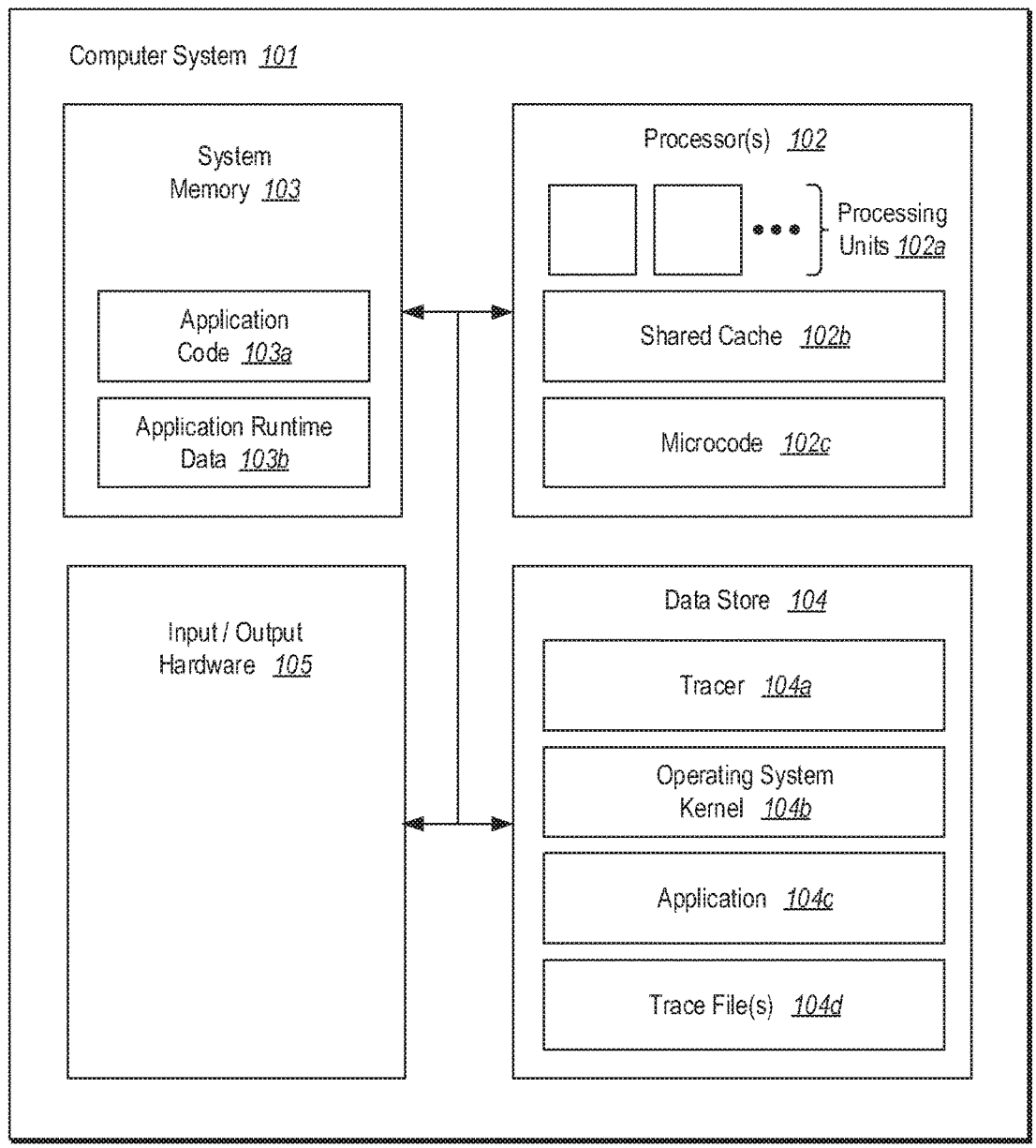
FIG. 1 illustrates an example computing environment that facilitates recording a trace file of program execution using a shared processor cache.

FIG. 1 illustrates an example computing environment 100 that facilitates recording a trace file of program execution using a shared processor cache. As depicted, embodiments may comprise or utilize a special-purpose or general-purpose computer system 101 that includes computer hardware, such as, for example, one or more processors 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application programs such as, for example, a tracer 104a, an operating system kernel 104b, and application 104c (e.g., the application that is the subject of tracing by the tracer 104a, and one or more trace file(s) 104d). When these programs are executing (e.g., using the processor(s) 102), the system memory 103 can store corresponding runtime data, such as runtime data structures, computer-executable instructions, etc. Thus, FIG. 1 illustrates the system memory 103 as including time application code 103a and application runtime data 103b (e.g., each corresponding with application 104c).

The tracer 104a is usable to trace execution of an application, such as application 104c, and to store trace data in the trace file 104d. In some embodiments, the tracer 104a is a standalone application, while in other embodiments the tracer 104a is integrated into another software component, such as the operating system kernel 104b, a hypervisor, etc. While the trace file 104d is depicted as being stored in the data store 104, the trace file 104d may also be recorded exclusively or temporarily in the system memory 103, or at some other storage device.

FIG. 1 includes a simplified representation of the internal hardware components of the processor 102. As illustrated, each processor 102 includes a plurality of processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., tracer 104a, operating kernel 104b, application 104c, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102a. In general, the shared cache 102b is a small amount (i.e., small relative to the typical amount of system memory 103) of random-access memory that stores on-processor copies of portions of the system memory 103. For example, when executing the application code 103a, the shared cache 102b contains portions of the application runtime data 103b. If the processing unit(s) 102a require data not already stored in the shared cache 102b, then a "cache miss" occurs, and that data is fetched from the system memory 103 (potentially evicting some other data from the shared cache 102b). Entries (or lines) in the shared processor cache 102b are mapped to memory addresses in system memory 103 (these could be physical or virtual addresses, depending on processor). As discussed in more detail later, a cache can be a "directly mapped cache" (meaning that each memory address can be cached into only one particular line in the shared processor cache 102b), or an "associative cache" (meaning that each memory address can be cached into one of a set of lines in the shared processor cache 102b).

A shared cache 102b may include a code cache portion and a data cache portion (not depicted). For example, when executing the application code 103a, the code cache stores at least a portion of the processor instructions stored in the application code 103a and the data cache stores at least a portion of data structures of the application runtime data 103b. Often times, a processor cache is divided into separate tiers/layers (e.g., layer 1, layer 2, and layer 3), with some tiers (e.g., layer 3) potentially existing separate from the processor 102. Thus, the shared cache 102b may comprise one of these layers (layer 1), or may comprise a plurality of these layers.

Each processing unit 102 also includes microcode 102c, which comprises control logic (i.e., executable instructions) that control operation of the processor 102, and which generally functions as an interpreter between the hardware of the processor and the processor instruction set architecture exposed by the processor 102 to executing applications. The microcode 102 may be embodied on on-processor storage, such as ROM, EEPROM, etc.

Figure 2:
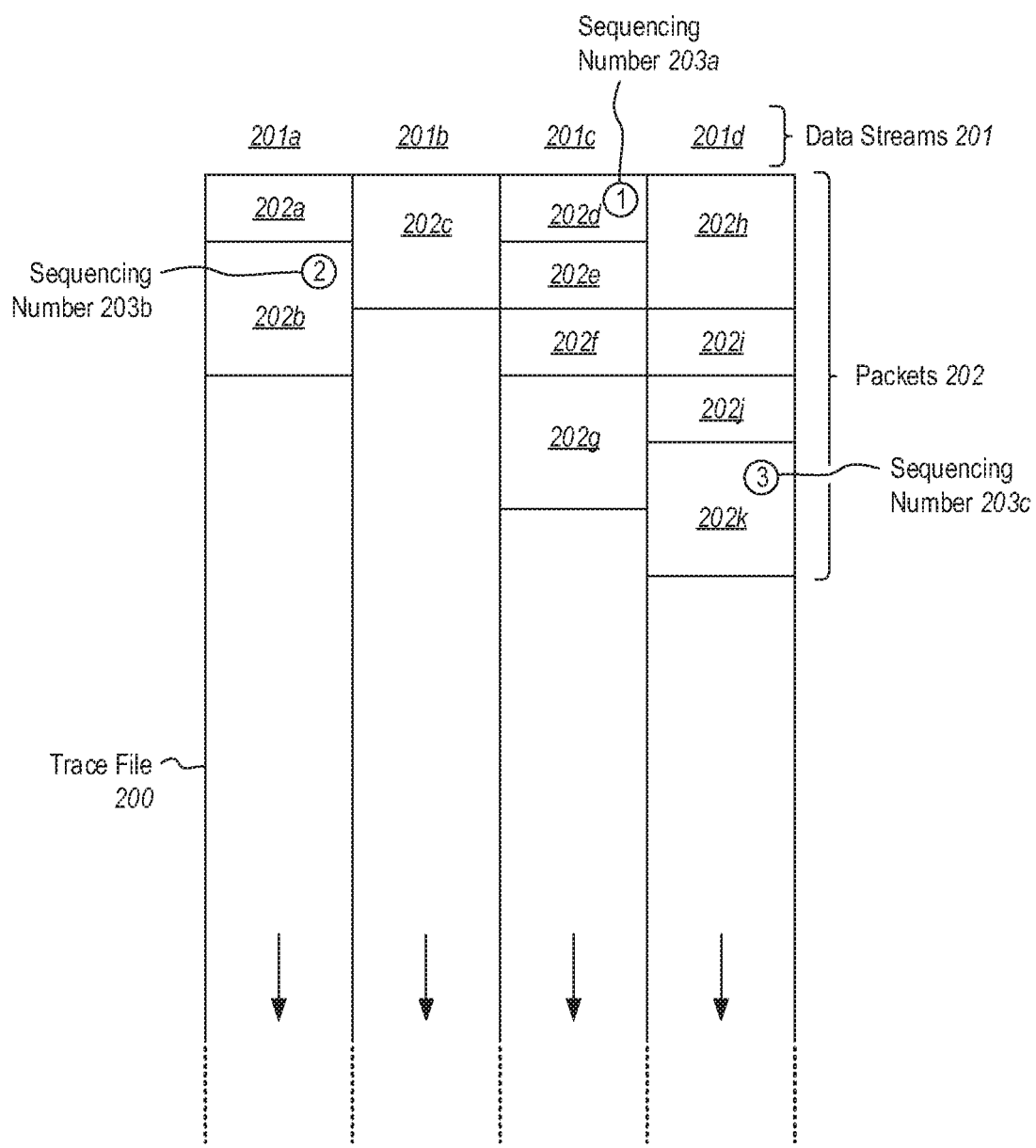
FIG. 2 illustrates an example trace file.

FIG. 2 illustrates an example trace file 200 (e.g., corresponding to trace file 104d of FIG. 1). During execution of an application (e.g., application 104c), the tracer 104a can maintain a separate data stream 201 in the trace file 200 for each processing unit 102a (i.e., for each thread). The example trace file 200 includes four data streams 201a-201d (and thus would correspond to four processing units executing four different threads), but the trace file 200 could include any number of data streams 201 depending on a number of processing units 102a available at the computer system 101 (whether they be in a single processor 102 or multiple processors 102) and/or a number of threads utilized by the application 104c.

The data steams 201 may be included in a single file, or may each be stored in different files. Each data stream 201 includes data packets 202 storing trace data that is usable to reproduce execution of the corresponding thread. As depicted, individual packets 202 may be of differing sizes, depending on trace file implementation and on the particular information stored. In the depicted example, data stream 201a for a first processing unit/thread has logged packets 202*a* and 202*b*, data stream 201*b* for a second processing unit/thread has logged packet 202*c*, data stream 201*c* for a third processing unit/thread has logged packets 202*d*-202*g*, and data stream 201*d* for a fourth processing unit/thread has logged packets 202*h*-202*k*.

In general, each data stream 201 is recorded independently, such that the timing of the events recorded by data packets in one data stream is generally independent from the timing of the events recorded by data packets in another data stream. However, in some embodiments, the trace file 200 stores sequencing events that record the execution sequence of certain "orderable" events across the threads. For example, FIG. 2 also illustrates that packet 202*d* of data stream 201*c* includes a first sequencing number 203*a*, packet 202*b* of data stream 201*a* includes a second sequencing number 203*b*, and packet 202*k* of data stream 201*d* includes a third sequencing number 203*c*. Thus, using the sequencing numbers 203*a*-203*c*, it is known that an orderable event recorded in packet 202*d* on data stream 201*c* occurred prior to an orderable event recorded in packet 202*b* on data stream 201*a*, and that the orderable event recorded in packet 202*b* on data stream 201*a* occurred prior to an orderable event recorded in packet 202*k* on data stream 201*d*.

Embodiments may utilize as the sequencing number a monotonically incrementing number ("MIN"), which is guaranteed not to repeat. Orderable events may be defined according to a "trace memory model," which is used to identify how to store (e.g., in a trace) interactions across threads (e.g., based on how the threads interact through shared memory, their shared use of data in the shared memory, etc.). Depending on implementation, a trace memory model may be weaker or stronger than a memory model used by the processor 102. The trace memory model used may be a memory model defined by a programming language used to compile code (e.g., C++ 14), or some other memory model defined for purposes of tracing.

Some implementations of application tracing observe execution of each thread of an application, and may record, for each thread, one or more of (i) initial state of a thread's execution (e.g., processor registers), (ii) the side effects of certain instructions, such as "non-deterministic" instructions (i.e., those instructions that do not produce fully predictable outputs because their outputs are not fully determined by data in processor general registers or memory) and/or un-cached reads by recording register values and/or memory values that were changed by execution of the instruction, or (iii) the memory values that instructions in the thread consumed. Using this data, and using the actual code of the application being traced, a full reproduction of application execution can be reproduced.

Various embodiments herein improve on these techniques by modifying the behavior of the processor 102's shared processor cache 102*a* to facilitate recording cache data that is actually consumed by a processing unit as it executes a thread.

Figure 3A:
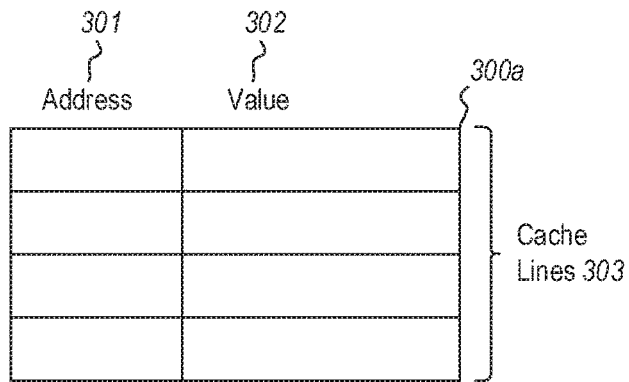
FIG. 3A illustrates an example conventional shared cache.

Initially, FIG. 3A illustrates a logical view of a conventional shared cache 300*a*. As depicted, the shared cache 300*a* includes a plurality of cache lines 303, each of which includes an address portion 301 and a value portion 302. While, for simplicity in illustration, only four cache lines 303 are depicted, one of ordinary skill in the art will recognize that an actual shared processor cache would likely have many more cache lines. For example, a contemporary INTEL processor may contain a layer-1 cache comprising 512 cache lines. In this cache, each cache line is usable to store a 64 byte (512 bit) value in reference to an 8 byte (64 bit) memory address (i.e., a physical or virtual address in the system memory 103).

In general, embodiments presented herein operate to utilize the shared processor cache 102*b*, at least in part, to generate trace file(s) 104*d*. There are several ways in which this can be done. One straightforward approach is to log all cache misses related to a traced entity to the trace file(s) 104*d*. However, this approach has the disadvantage of generating large trace files. This is because the shared processor cache 102*b* is used by entities other than the ones being traced, including other applications and the operating system kernel 104*b*. Thus, when there are context switches to entities other than the one being traced, these entities can "pollute" the cache by causing cache misses or otherwise writing to the cache. As a result, each time context returns to the entity being traced this approach would need to assume that the cache contains no valid entries for the entity being traced, and continue logging all cache misses for the traced entity—even though these entries may have been previously logged prior to the context switch. For example, this approach may need to invalidate (e.g., flush) and/or log all cache entries that correspond to the entity being traced each time there is a context switch to another entity, since they may be polluted by that other entity during its execution.

Accordingly, embodiments herein include mechanisms for identifying and logging only cache misses relating to the entity being traced, while avoiding re-logging prior logged cache entries after a context switch. In particular, embodiments operate to identify when a cache line has been consumed by an entity (e.g., thread) being traced, so that only these cache lines are logged into the trace file(s) 104*d*, and also operate to account for cache pollutions by other entities. Two general embodiments for identifying cache lines that are to be logged are presented herein. The first extends the shared processor cache 102*b* by associating one or more "accounting bits" with each cache line, and uses those bits to identify when a processing unit (and, by extension, executing thread) has consumed the cache line, and to identify when the cache line has been polluted by another entity. The first embodiment can be used with both directly mapped caches and associative caches. The second utilizes associative caches, coupled with processor cache way-locking features of some processors, to reserve a subset of the cache for exclusive use by the traced entity and then logs cache misses relating to that subset of the cache.

Facilitating Trace Recording Via Use of Processor Cache Accounting Bits

Figure 3B:
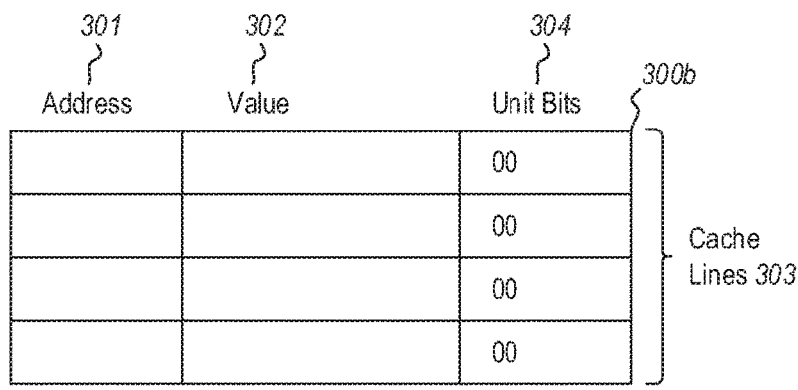
FIG. 3B illustrates an example shared cache that extends each cache line with additional accounting bits that each corresponds to a different processing unit.

In accordance with the first general embodiment, FIG. 3B illustrates an example shared cache 300*b* that extends each cache line 303 with additional "accounting bits" that each correspond to a different processing unit 102*a* of the processor 102. For example, each cache line 303 of shared cache 300*b* includes accounting bits in the form a "unit bits" portion 304. Thus, in some embodiments, a shared cache that is shared by two processing units 102*b* could include two bits in the unit bits portion 304, as represented by the '00' in each cache line. In connection with these unit bits added to each cache line, embodiments extend the processor's hardware-implemented logic and/or the processor's microcode 102*c* to utilize these unit bits to track whether or not the current value in the cache line has been logged (i.e., in the trace file 104*d*) on behalf of each processing unit or is otherwise known to the processing unit. For example, a unit bit on a cache line may be set (e.g., to a value of one or true) to indicate that the processing unit associated with the unit bit has logged the current value of the cache line in the trace file 200 (or is otherwise aware of the value), and may be cleared (e.g., to a value of zero or false) to indicate that the processing unit associated with the unit bit does not have the current value of the cache line in the trace file 200 (or is otherwise not aware of the value). Of course the opposite may be true, and each unit bit may be set with a value of zero/false and cleared with a value of one/true.

Figure 5:
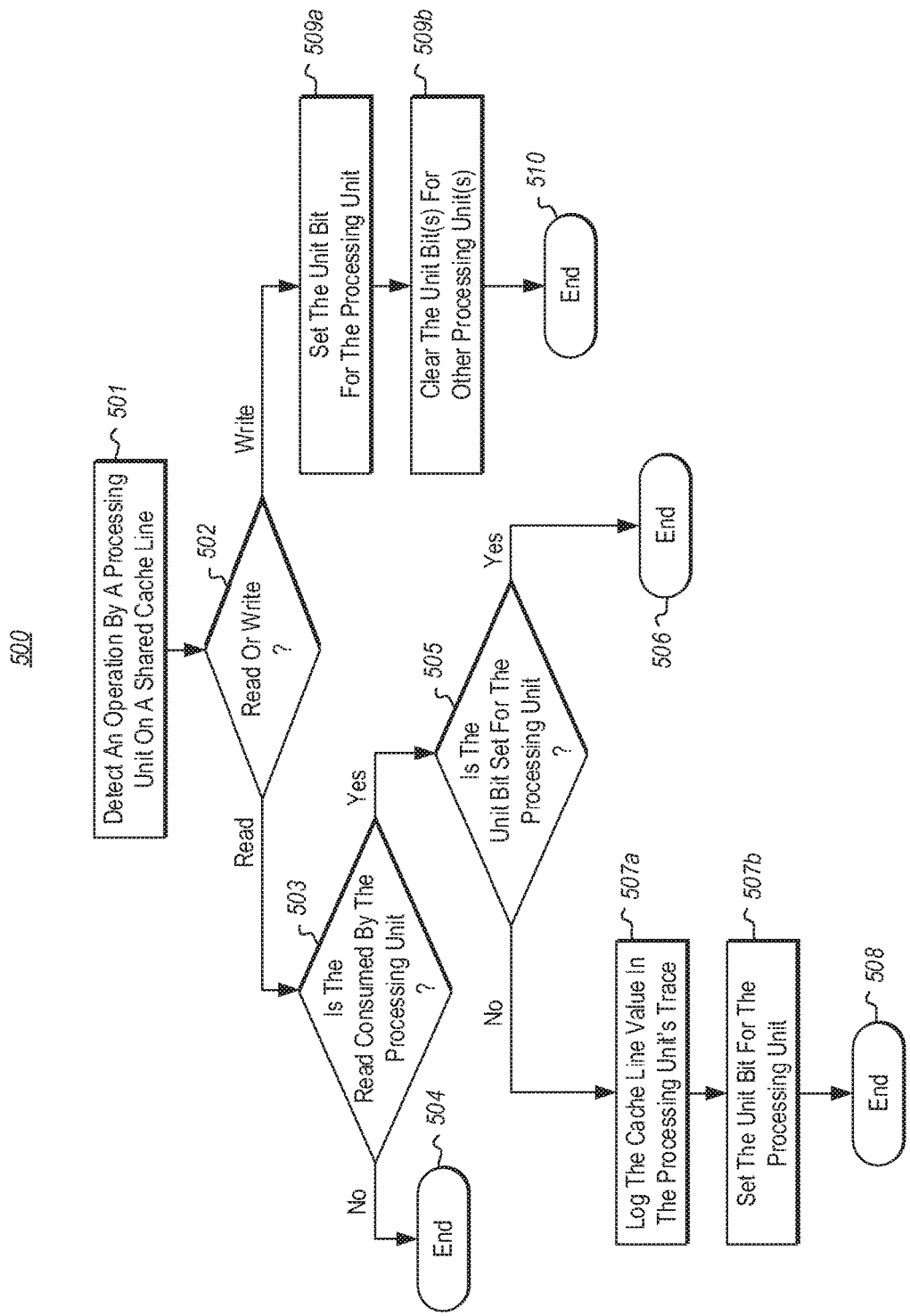
FIG. 5 illustrates a flowchart of an example method for recording a trace file of program execution using a processor cache that stores unit bits.

FIG. 5 illustrates a flowchart of an example method 500 for recording a trace file of program execution using a processor cache that stores unit bits, such as the shared cache 300b of FIG. 3B. For example, method 500 may include acts that are performed by the processor 102 as the tracer 104a traces the application 104c. The actions made by the processor 102 may be based on hard-coded logic in the processor 102, soft-coded logic in the microcode 102c, or by another program such as the tracer 104 and/or the operating system kernel 104b.

The method 500 begins at act 501, when the processor 102 detects that there is an operation by a processing unit on a shared cache line. For example, suppose that the processor 102's shared cache 102b is shared by two processing units 102a (i.e., P0 and P1). Act 501 may be a result of processing unit P0 performing an operation on a cache line identified by a particular address. Operations may include, for example, a read of a value from the cache line that is caused by a program instruction, a speculative or an implicit read by the processing unit (i.e., reads performed by the processing unit as part of anticipating values that may be needed, or as part maintaining some sort of illusion), or a write to the cache line. At block 502, the processor 102 distinguishes between a read operation and a write operation, and takes two branches depending on the operation type.

If the operation is a read operation, then following the 'read' path from decision block 502, at decision block 503 the processor 102 determines whether the read was consumed by the processing unit (P0). In some embodiments, a read is consumed by a processing unit if is used by an instruction of the application 104c that is being traced. Thus, for example, if the read was caused by P0 as part of a speculative or an implicit read, the read would not have been caused by an instruction of the application 104c, and would thus not have been consumed by P0. Following the 'no' path from decision block 503, the method would therefore end at 504 in the case of a speculative or an implicit read.

Alternatively, if the read was caused by an instruction of the application 104c that is being traced, the read would have been consumed by P0. Following the 'yes' path from decision block 503, decision block 505 is encountered, in which it is determined whether the unit bit for the processing unit is set. As discussed above in connection with FIG. 3B, a unit bit is set for a processing unit when the processing unit has logged or is otherwise aware of the current value in the subject cache line. Thus, if the unit bit for P0 is set, then P0 has already logged the value. In this case, following the 'yes' path from decision block 505 the method ends at 506. Alternatively, if the unit bit for P0 is clear, then P0 has not logged the value. Thus, following the 'no' path from decision block 505, at act 507a the value is logged in P0's trace (e.g., a data stream corresponding to P0), and at act 507b P0's unit bit is set to indicate that it has logged the value in the trace. The method then ends at 508. The particular ordering of acts 507a and 507b could vary, including the acts being performed in parallel. As such, the depicted ordering is non-limiting.

Returning to decision block 502, if the operation were instead a write operation, then following the 'write' path from decision block 502, at act 509a the processor 102 sets the unit bit for the processing unit performing the write operation, and at act 509b the processor clears the unit bits for other processing units. Then, at 510 the method ends. For example, the processor 102 would ensure that the unit bit for P1 is cleared, and that the unit bit for P0 is set. Doing so indicates that any value that P1 may have logged or is otherwise aware of for the cache line is no longer valid, since it was potentially changed by P0. The particular ordering of acts 509a and 509b could vary, including the acts being performed in parallel. As such, the depicted ordering is non-limiting.

Following is a first concrete example demonstrating general operation of method 500 in the context of shared cache 300b. This example assumes a very simple two-line shared cache in which each cache line has bits reserved for a memory address, a value, and accounting bits including unit bits for two processing units (P0 and P1). In this case, an initial state of the shared cache may be (with the left unit bit corresponding to P0 and the right unit bit corresponding to P1):

| Address | Value | Bits Per Unit |
|---------|-------|---------------|
| <null>  | <null>| 0 - 0         |
| <null>  | <null>| 0 - 0         |

In a first step, suppose P0 were to perform a speculative or an implicit read from address X. Here, a cache miss occurs (since the value was not already in the cache) so the data is imported into the first cache line of the shared cache 300b from system memory 103. Note that no express log entry needs to be made to document the occurrence of a cache hit, a cache miss, or a cache eviction. In FIG. 5, following the 'read' branch from decision block 502, it would be determined at decision block 503 that the read was not consumed by P0 (i.e., since it was caused by the processor instead of a program instruction). As such, the method ends at 504, without having logged anything to the trace. Following the read, the cache would now contain the value of X that was imported to the cache:

| Address | Value | Bits Per Unit |
|---------|-------|---------------|
| X       | <$1^{st}$ value of X> | 0 - 0 |
| <null>  | <null>| 0 - 0         |

Next, in a second step, suppose P0 were to perform a read from address Y. Another cache miss occurs (since the value was not already in the cache) so the data is imported into the second line of the shared cache 300b from the system memory 103. In FIG. 5, following the 'read' branch from decision block 502, it would be determined at decision block 503 that the read was consumed by P0. Thus, following the 'yes' branch to decision block 505 is it determined whether the unit bit in the cache line storing address Y that corresponds to P0 is set. Here, the bit is not set (it has a zero value), so this is new information for P0. Thus, at act 507a a packet is added to the trace for P0 that contains at least the first value of Y, and at act 507b P0's unit bit is set to indicate that it has logged the value in the cache line. At 508 the method ends. Now, the state of the cache is as follows:

| Address | Value | Bits Per Unit |
|---------|-------|---------------|
| X | <1$^{st}$ value of X> | 0 - 0 |
| Y | <1$^{st}$ value of Y> | 1 - 0 |

Next, in a third step, suppose P0 were to perform another read from address Y. In FIG. 5, following the 'read' branch from decision block 502, it would be determined at decision block 503 that the read was consumed by P0. Thus, following the 'yes' branch to decision block 505 is it determined whether the unit bit in the cache line storing address Y that corresponds to P0 is set. Here, the bit is set (it has a value of one), so this is not new information for P0. Thus, at 506 the method ends. No information has been added to the trace, and the state of the cache has not changed:

| Address | Value | Bits Per Unit |
|---------|-------|---------------|
| X | <1$^{st}$ value of X> | 0 - 0 |
| Y | <1$^{st}$ value of Y> | 1 - 0 |

Next, in a fourth step, suppose P1 were to perform a read from address Y. In FIG. 5, following the 'read' branch from decision block 502, it would be determined at decision block 503 that the read was consumed by P1. Thus, following the 'yes' branch to decision block 505 is it determined whether the unit bit in the cache line storing address Y that corresponds to P1 is set. Here, the bit is not set (it has a zero value), so this is new information for P1. Thus, at act 507a a packet is added to the trace for P1 that contains the first value of Y, and at act 507b P1's unit bit is set. At 508 the method ends, and the state of the cache is as follows:

| Address | Value | Bits Per Unit |
|---------|-------|---------------|
| X | <1$^{st}$ value of X> | 0 - 0 |
| Y | <1$^{st}$ value of Y> | 1 - 1 |

Next, in a fifth step, suppose P0 were to perform a write to address Y. In FIG. 5, following the 'write' branch from decision block 502, at acts 509a/509b the unit bit for P0 is set (since P0 knows the value that was just written), and the unit bit for P1 is cleared (since its knowledge of the value of Y is no longer up to date). Note that since the unit bit for P0 was already set, the processor 102 may be optimized to refrain from actually setting the bit. Similarly, if the unit bit for P1 were to have already been in a cleared state, the processor 102 may be optimized to refrain from actually clearing the bit. Regardless of how the processor 102 accomplishes acts 509a/509b, what matters is that the unit bit for the processing unit doing the write (i.e. P0 in this case) is set, and the unit bits for all other processing units (i.e., P1 in this case) are cleared. Note that the trace for P0 need not be updated with the new value of Y, since P0 performed the write and it already has knowledge of the value written. At 510 the method ends, and the state of the cache is as follows:

| Address | Value | Bits Per Unit |
|---------|-------|---------------|
| X | <1$^{st}$ value of X> | 0 - 0 |
| Y | <2$^{nd}$ value of Y> | 1 - 0 |

Next, in a sixth step, suppose P0 were to perform another write to address Y. In FIG. 5, following the 'write' branch from decision block 502, at acts 509a/509b the unit bit for P0 is set, and the unit bits for all other processing units are cleared. In this case, these bits actually need not change, since they are already in the proper state. Again, the trace for P0 need not be updated with the new value of Y, since P0 performed the write and it already has knowledge of the value written. At 510 the method ends, and the state of the cache is as follows:

| Address | Value | Bite Per Unit |
|---------|-------|---------------|
| X | <1$^{st}$ value of X> | 0 - 0 |
| Y | <3$^{rd}$ value of Y> | 1 - 0 |

For simplicity in illustration, there may be some considerations not expressly depicted in FIG. 5, the behavior of which may vary based on implementation. For example, a write, by a processing unit, to data that is does not already have cached.

To illustrate, suppose that in a seventh step P1 were to perform a write to address Y. Here, since the unit bit for P1 is in a cleared state P1 does not already have knowledge of the value at address Y. This can be handled in a couple of ways, (i) performing the write without first bringing in the value, or (ii) doing a cache miss to bring the value at the address into the cache, and then performing the write (i.e., a read followed by a write).

In the first case, the processor 102 could perform the write and mark the unit bits for the other processing units as not current (i.e., act 509b), with nothing being added to the trace. In this instance, however, the processor 102 does not mark the cache value as known to P1 (e.g., act 509a is skipped). This would result in an end state of the cache as follows:

| Address | Value | Bits Per Unit |
|---------|-------|---------------|
| X | <1$^{st}$ value of X> | 0 - 0 |
| Y | <4$^{th}$ value of Y> | 0 - 0 |

In the second case, the processor 102, could first perform a read, by following the 'read' path from decision block 502, following the 'yes' path from decision block 503, taking the 'no' path from decision block 505, logging the third value of Y to P1's trace and setting P1's unit bit at 507a/507b, and ending at 508. The intermediary state of the cache would then be as follows:

| Address | Value | Bits Per Unit |
|---------|-------|---------------|
| X | <1$^{st}$ value of X> | 0 - 0 |
| Y | <3$^{rd}$ value of Y> | 1 - 1 |

Then, the processor 102, could perform the write, by following the 'write' path from decision block 502, performing acts 509a/509b, and ending at 510. Thus, the end state of the cache would be:

| Address | Value | Bite Per Unit |
|---------|-------|---------------|
| X | <1$^{st}$ value of X> | 0 - 0 |
| Y | <4$^{th}$ value of Y> | 0 - 1 |

Rather than adding accounting bits (unit bits, in this case) to each cache line, some embodiments instead reserve entire cache lines for the accounting bits. Doing so may simplify designing the processor 102 to facilitate recording a trace file, since the physical layout of the shared cache 102b may be left unchanged, and the use of accounting bits may be enabled by modifications to the microcode 102c.

Figure 4A:
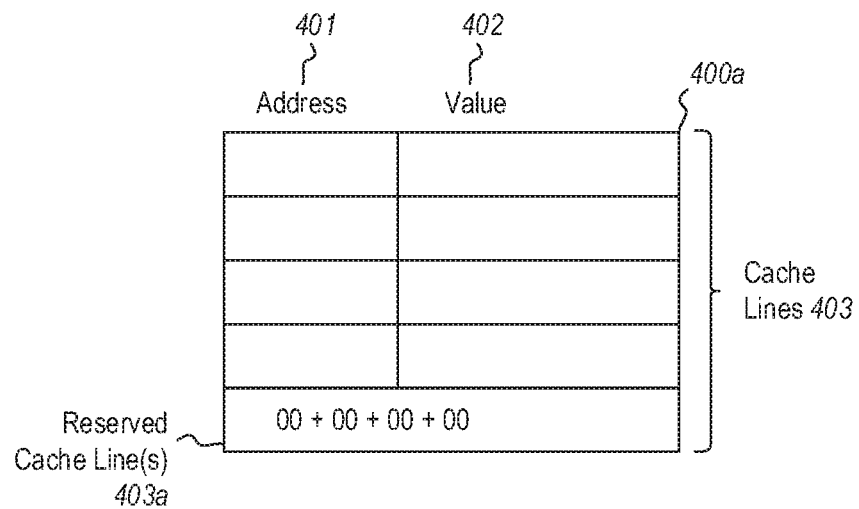
FIG. 4A illustrates an example shared cache that reserves one or more cache lines for storing accounting bits that apply to other cache lines.

FIG. 4A illustrates an example of a shared cache 400a that reserves one or more cache lines for storing accounting bits (e.g., unit bits) that apply to other cache lines. Similar to FIGS. 3A and 3B, the shared cache 400a of FIG. 4A includes a plurality of cache lines 403, each of which has an address portion 401 and a value portion 402. However, the shared cache 400a includes one or more reserved cache line(s) 403a that are used for storing accounting bits (unit bits). The bits of the reserved cache line are allocated into different groups of unit bits that each corresponds to a different cache line, and in which each unit bit in a group correspond to a different processing unit 102b. For example, the shared cache 400a depicts four groups of unit bits stored in the reserved cache line, with each unit bit in the group corresponding to a different processing unit of two available processing units (the "+" marks are merely included to visually separate the groups in the drawing). If there were more than two processing units, then each group would have an additional unit bit for each additional processing unit. Notably, using a reserved cache line to store metadata for many cache lines is usable beyond shared caches and could be extended, for example, to private caches.

As depicted, the reserved cache line 403a may in some embodiments use all bits of the cache line for accounting bits, without regard for standard address vs. value bit divisions of the cache line. In some embodiments, however, the accounting bits are stored only in the value portion of the cache line. In such cases, the address portion may be used to identify the reserved cache line, to signal the cache line as being reserved, or for some other purpose.

To illustrate, if the example INTEL cache discussed above (having 512 cache lines each having a 64 bit value portion and a 512 bit value portion) were to be shared by two processing units, two of those cache lines could be reserved for accounting bits (unit bits, in this case). Thus, 510 cache lines would remain available as regular cache lines for caching data. In some implementations, a first cache line of the reserved cache lines may then store unit bits for a first half (i.e., 255) of the remaining cache lines, and a second cache line of the reserved cache lines may then store unit bits for a second half (i.e., 255) of the remaining cache lines. Thus, 510 bits of the 512 bits of the value portion of each cache line could be used for unit bits (i.e., two unit bits each corresponding to one of the two processing units, multiplied by 255 cache lines), with the remaining two bits being left unused or used for some other purpose. Of course, the address portion could be used for accounting bits and/or for some other purpose.

In context of the shared cache 400a of FIG. 4A, operation of the method 500 of FIG. 5 would be analogous to how it was described in connection with the shared cache 300b and the first concrete example, except that the unit bits in the reserved cache lines 403a are used instead of unit bits added to each cache line. For example, the first set of two unit bits in the reserved cache line would be used similarly to the unit bits for the first cache line and in connection with P0 and P1, the second set of two unit bits in the reserved cache line would be used similarly to the unit bits for the second cache line and in connection with P0 and P1, and so forth.

Figure 3C:
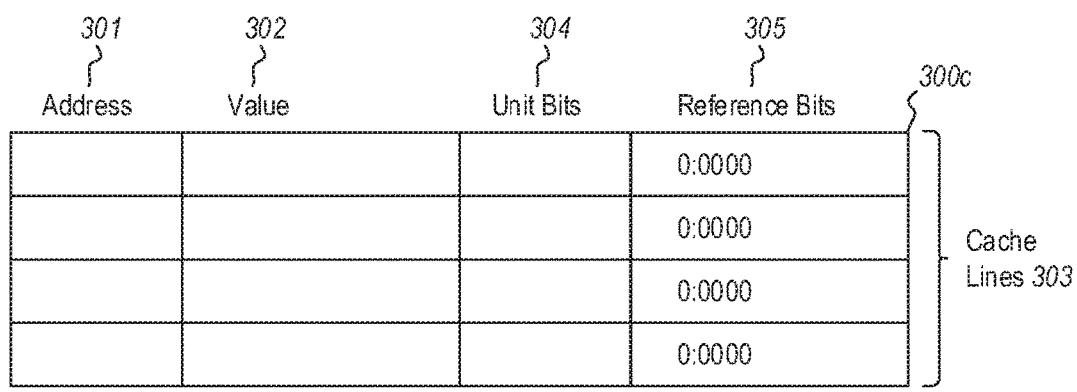
FIG. 3C illustrates an example shared cache that includes, for each cache line, additional accounting bits in the form of a "reference value" portion.

Significant trace file size optimizations can be further achieved using additional "reference value" accounting bits in the shared cache 102c. For example, FIG. 3C illustrates an example shared cache 300c that includes, for each cache line, additional accounting bits in the form of a "reference bits" portion 305. The bits in the reference bits portion are used to store a reference to a location in a processing unit's trace, for when that processing unit recorded a cache line value in its trace. Then, when that same cache line is later consumed by another processing unit, and the cache line contains the same address and value, the other processing unit can record only the reference value stored in the reference bits, instead of the cache line's value. Since storing reference values can occupy a fraction of the bits that storing the cache values may occupy, substantial trace file size savings can result. As an example, in the second step of the concrete example above a packet containing the value of Y was added to P0's trace. Later, in the fourth step, the same value was added to P1's trace. Using reference values, storing the full value could have been avoided in favor of storing a reference value.

To illustrate possible space savings, suppose that, as part of recording a cache line's value in the trace file 200, the tracer 104a adds a packet to a processing unit's data stream that includes both the memory address and the value. In the case of the example INTEL cache used above (in which each cache line has an 8 byte value portion and a 64 byte value portion), recording the address and the value would occupy 72 bytes on the trace file. Now, suppose that an implementation utilizing this cache stored a reference value (i.e., in the reference value portion 305) as an 8 byte sequencing number (e.g., as discussed in connection with FIG. 2), plus an 8 byte count (e.g., an instruction count counting the number of instructions executed by the processor since the sequencing number was added to the trace). Such a reference would occupy only 16 bytes. Thus, use of a reference number (instead of recording the full memory address/value) would enable a debugger replaying the trace file 200 to uniquely identify in the trace when a given processor recorded the address and value, based on a 16 byte trace entry as opposed to a 72 byte trace entry.

The forgoing provides a nearly 5:1 space savings for a trace entry versus storing the full address and value each time a value is consumed. Other possible reference notations could include a processor identification followed by some count that could identify when in that processor's trace the reference value was stored. Those of ordinary skill in the art will recognize that there are a multitude of different reference notations that could be used. In FIG. 3C the reference values are symbolically illustrated as "0:0000" referring to a processor identifier and a count, separated by a colon (":").

Figure 4B:
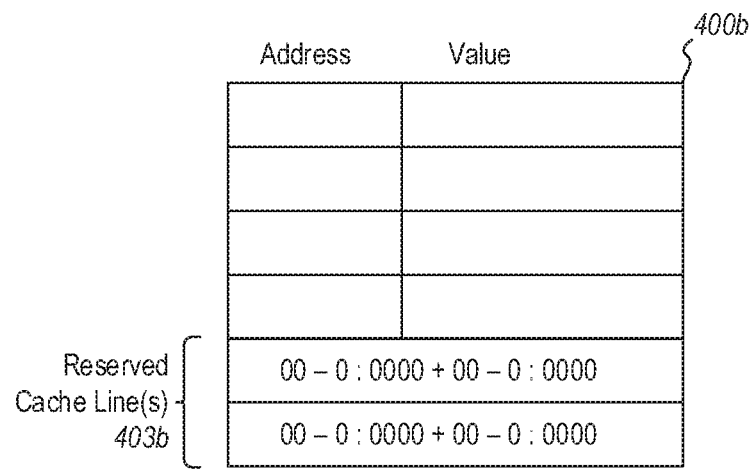
FIG. 4B illustrates an example shared cache that stores both unit accounting bits and reference value accounting bits in reserved cache lines.

Just as, in FIG. 4A, a shared cache 400a may store accounting bits (unit bits) using reserved cache lines instead of adding bits to each cache line (as in the shared cache 300b of FIG. 3B), some embodiments may store reference bits in reserved cache lines. For example, FIG. 4B illustrates an embodiment of a shared cache 400b that stores both unit accounting bits and reference value accounting bits in reserved cache lines 403b. In the reserved cache lines 403b of the shared cache 400b, each of the two reserved cache lines stores accounting bits for two different cache lines, using two pluralities of accounting bits, each including unit bits for P0 and P1 (00), followed by reference bits (0:0000, such that each plurality is symbolically notated as 00-0: 0000).

Figure 6:
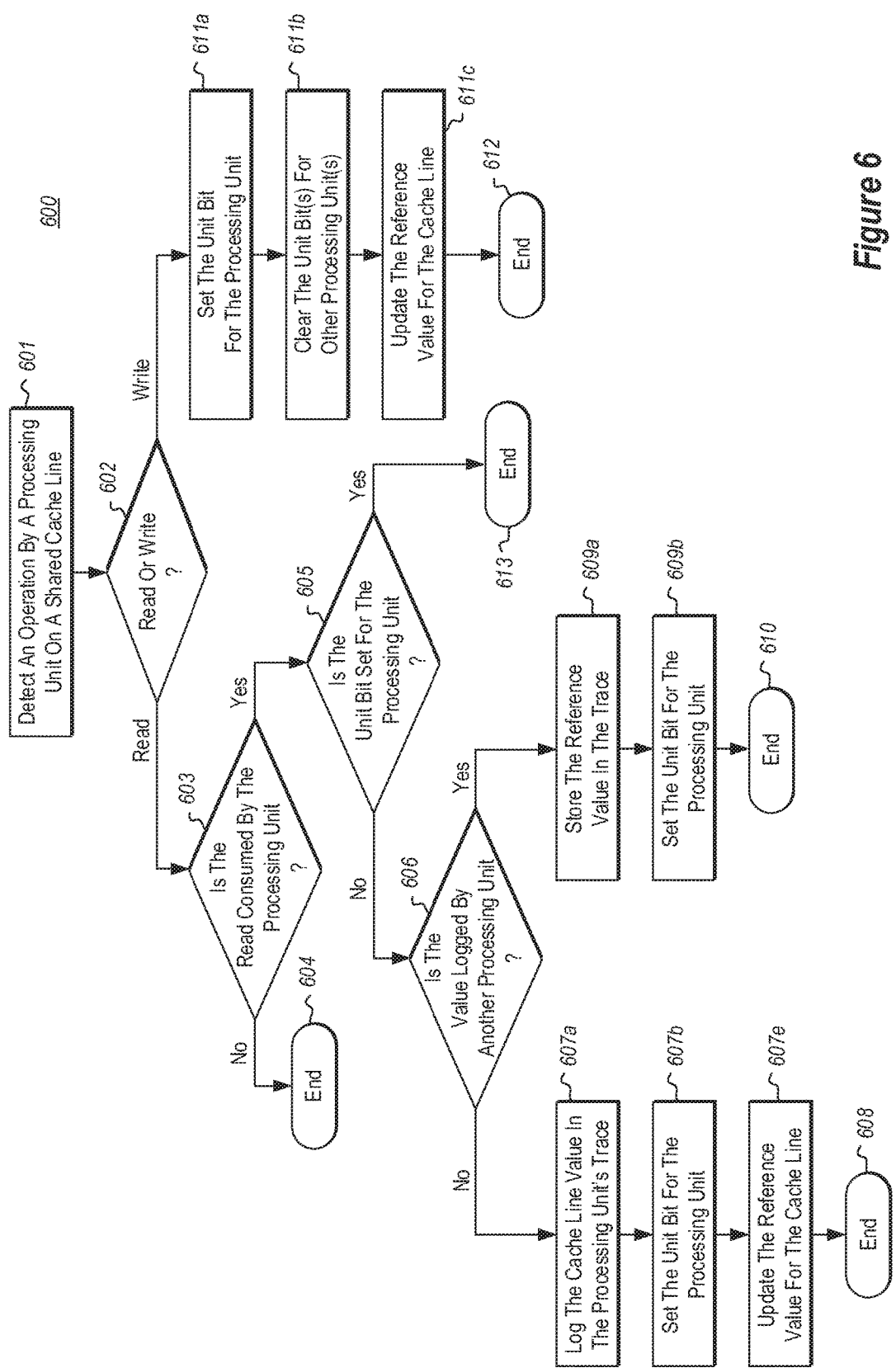
FIG. 6 illustrates a flowchart of an example method for recording a trace file of program execution using a processor cache storing reference bits.

FIG. 6 illustrates a flowchart of an example method 600 for recording a trace file of program execution using a processor cache storing reference bits, such as the shared cache 300c of FIG. 3C or the shared cache 400b of FIG. 4B. Many of the initial elements (e.g., 601, 602, 603, 604, 605, and 613) of FIG. 6 operate similar to corresponding elements (e.g., 501, 502, 503, 604, 505, and 506). As such, the discussion in connection with FIG. 5 applies to these elements and are not described in detail here.

Similar to the discussion of FIG. 5, suppose that the processor 102's shared cache 102b is shared by two processing units 102a (i.e., P0 and P1). Now, suppose that a processing unit (e.g., P0) has performed a read that is consumed by the processing unit, and that the unit bit for the processing unit is not set. Flow would proceed through elements 601, 602, 603, and 605 to arrive at new decision block 606. Here, it is determined if the value being read has already been logged by another processing unit. This can be determined by observing the values of the unit bits for the cache line being read—if the unit bit for any other processing unit (e.g., P1) is set, then that processing unit has logged the value. If not, then following the 'no' path, the processor logs the cache line and sets the processing unit's (e.g., P0's) unit bit in acts 607a and 607b (which are analogous to acts 507a and 507b of FIG. 5) and updates the reference value for the cache line at act 607c. In particular, the processing unit may store in the reference bits any reference notation that enables the value that was just logged in act 507a to be found later by a debugger for use in connection with another processing unit. Then, at 608, the method ends. The particular ordering of acts 607a-607c could vary, including the acts being performed in parallel. As such, the depicted ordering is non-limiting.

Returning to decision block 606, if the value had been logged by another processing unit (e.g., P1), then following the 'yes' path to acts 609a and 609b, the reference value stored in the cache for the cache line is logged in the trace for the processing unit currently doing the read (instead of the value of the cache line), and the unit bit is set for the processing unit (e.g., P0). This reference value would have been written by another processing unit (e.g., P1) when it previously consumed the value of the cache line, and logged that value in the trace in connection with acts 607a-607b. The method then ends at 610. The particular ordering of acts 609a and 609b could vary, including the acts being performed in parallel. As such, the depicted ordering is non-limiting.

Now, suppose instead that a processing unit (e.g., P0) had performed a write operation. Flow would proceed through elements 601 and 602 to arrive at acts 611a-611c. Acts 611a and 611b are analogous to acts 509a and 509b (the unit bits of other processing units are cleared, and the unit bit for this processing unit is set), but at new act 611c, the reference value for the cache line is updated. In particular, since the processing unit that just performed the write has knowledge of the value written, this processing unit's trace could be replayed to this point to obtain the value later. As such, this value can be referenced by another processing unit using the reference value just written. At 612 the method ends. The particular ordering of acts 611a-611c could vary, including the acts being performed in parallel. As such, the depicted ordering is non-limiting.

Although not depicted, there could potentially be some additional steps that may also update a reference value. For example, a reference value may optionally be updated when the unit bit is set for a processing unit (i.e., following the 'yes' path from decision block 605, and prior to ending at 613), and/or when the value is logged by another processing unit (i.e., following the 'yes' path from decision block 606, and prior to ending at 610). Doing serves the purpose of keeping fresher reference values. In some embodiments, depending on how reference values are stored, this may help handle 'wrap around' in which the reference value grows to exceed a number of bits allocated to store the reference value.

Following is a second concrete example demonstrating general operation of method 600 in the context of shared cache 400b. This example assumes a very simple three-line shared cache in which two cache lines are used for caching system memory, and one cache line is reserved for accounting bits (both unit bits and reference bits). In this case, an initial state of the shared cache may be:

| Address | value |
|---|---|
| <null> | <null> |
| <null> | <null> |
| 00-<null> + 00-<null> | |

In this example, the reference value for a processing unit is simply notated as the processing unit's number and a count, separated by a colon (e.g., "0:0000"). In the table above, the reference values are initially set to 'null'. Using this simple notation, the value for a processing unit is incremented by one each time it is updated (e.g., 0:0001 for first reference value for P0, 0:0002 for second reference value for P0, 1:0001 for first reference value for P1, 1:0002 for second reference value for P1, and so forth). Note, however, that most implementations would use a reference value that can be reliably incremented in such a way that, at replay, a debugger can track the increment value for a given thread without tracking other threads. For example, the count could be based on activities like entries logged in the trace file for that thread, the number of activities that potentially could have been logged to the file, etc.

As in the first example, suppose that in a first step P0 were to perform a speculative or an implicit read from address X. Here, a cache miss occurs (since the value was not already in the cache) so the data is imported into the first line of the shared cache 300b from system memory 103. Again, no express log entry needs to be made to document the occurrence of a cache hit, a cache miss, or a cache eviction. In FIG. 6, following the 'read' branch from decision block 602, it would be determined at decision block 603 that the read was not consumed by P0 (i.e., since it was caused by the processor instead of a program instruction). As such, the method ends at 604, without having logged anything to the trace. Following the read, the cache would now contain the value of X:

| Address | Value |
|---|---|
| X | <1st value of X> |
| <null> | <null> |
| 00-<null> + 00-<null> | |

Next, in a second step, suppose P0 were to perform a read from address Y. Another cache miss occurs (since the value was not already in the cache) so the data is imported into the second line of the shared cache 400b from the system memory 103. In FIG. 6, following the 'read' branch from decision block 602, it would be determined at decision block 603 that the read was consumed by P0. Thus, following the 'yes' branch to decision block 605 is it determined whether the unit bit in the cache line storing address Y that corresponds to P0 is set. Here, the bit is not set (it has a zero value), so this is new information for P0. Thus, following the 'no' path to decision block 606, it is determined whether the value is logged by another processing unit. Since P1's unit bit for the cache line is cleared, flow takes the 'no' path to acts 607a and 607b, where a packet is added to the trace for P0 that contains at least the first value of Y and P0's unit bit is set to indicate that it has logged the value in the cache line (i.e., the unit bits now "10"). Additionally, at act 607c the reference value for the cache line is updated. Here, it is represented as "0:0001," indicating that P0 has the value at a count of 0001 (whatever that count may be, depending on implementation, so long as it can be used later to locate the value using P0's trace). At 608 the method ends. Now, the state of the cache is as follows:

| Address | Value |
| --- | --- |
| X | <1$^{st}$ value of X> |
| Y | <1$^{st}$ value of Y> |
| | 00-<null> + 10-0:0001 |

Next, in a third step, suppose P1 were to perform a read from address Y. In FIG. 6, following the 'read' branch from decision block 602, it would be determined at 603 that the read was consumed by P1. Thus, following the 'yes' branch to decision block 605 is it determined whether the unit bit in the cache line storing address Y that corresponds to P1 is set. Here, the bit is not set (it has a zero value), so this is new information for P1. At decision block 606 it is determined whether the value is logged by another processing unit (i.e., P0). Here, it would be determined that the value is logged, since P0's unit bit is set for the cache line. Thus, following the 'yes' branch to acts 609a and 609b, the reference value (i.e., 0:0001) is stored in P1's trace, and P1's unit bit is set to note that it has logged (i.e., has a reference to, in this case) the value. At 610 the method ends, and the state of the cache is as follows:

| Address | Value |
| --- | --- |
| X | <1$^{st}$ value of X> |
| Y | <1$^{st}$ value of Y> |
| | 00-<null> + 11-0:0001 |

Note that, as illustrated above, storing the reference value can occupy orders of magnitude fewer bits on P1's trace than storing the value. In the example give above, for instance, the reference value may occupy 16 bytes versus occupying 72 bytes for storing a memory address and value. One of ordinary skill in the art will recognize, in view of the disclosure herein, that could be various different ways to store reference values that occupy various numbers of bits (in some cases far fewer than 16 bytes), so the space savings can vary based on implementation.

Now, in a fourth step, suppose that P1 were to perform a write to address Y. In FIG. 6, following the 'write' branch from decision block 602, at acts 611a/611b the unit bit for P1 is set (since it knows the value that was just written), and the unit bit for P0 is cleared (since its knowledge of the value of Y is no longer up to date). Note that since the unit bit for P1 was already set, the processor 102 may be optimized to refrain from actually setting the bit. Similarly, if the unit bit for P0 were to have already been in a cleared state, the processor 102 may be optimized to refrain from actually clearing the bit. Regardless of how the processor 102 accomplishes acts 611a/611b, what matters is that the unit bit for the processing unit doing the write (i.e. P1) is set, and the unit bits for all other processing units are cleared. Note that the trace for P1 need not be updated with the new value of Y, since P1 performed the write and it already has knowledge of the value written. Additionally, at act 611c the reference value for the cache line is updated such that the value could be obtained later by replaying P1's trace. At 612 the method ends, and the state of the cache is as follows:

| Address | Value |
| --- | --- |
| X | <1$^{st}$ value of X> |
| Y | <2$^{nd}$ value of Y> |
| | 00-<null> + 01-1:0001 |

Next, in a fifth step, suppose P1 were to perform another write to address Y. In FIG. 6, following the 'write' branch from decision block 602, at acts 611a/611b the unit bit for P1 is set, and the unit bits for all other processing units are cleared. In this case, these bits actually need not change, since they are already in the proper state. Again, the trace for P1 need not be updated with the new value of Y, since P1 performed the write and it already has knowledge of the value written. Additionally, at act 611c the reference value for the cache line is updated such that the value could be obtained later by replaying P1's trace. At 612 the method ends, and the state of the cache is as follows:

| Address | Value |
| --- | --- |
| X | <1$^{st}$ value of X> |
| Y | <3$^{rd}$ value of Y> |
| | 00-<null> + 01-1:0002 |

Finally, in a sixth step, suppose P0 were to perform another read from address Y. In FIG. 6, following the 'read' branch from decision block 602, it would be determined at decision block 603 that the read was consumed by P0. Thus, following the 'yes' branch to decision block 605 is it determined whether the unit bit in the cache line storing address Y that corresponds to P0 is set. Here, the bit is not set (it has a zero value), so this is new information for P0. Thus, following the 'no' path to decision block 606, it is determined whether the value is logged by another processing unit. Since P1's unit bit for the cache line is set, flow takes the 'yes' path to acts 609a and 609b where the reference value (i.e., 01:0002, referencing the 3$^{rd}$ value of Y on P1's trace) is stored in P0's trace, and P0's unit bit is set to note that it has logged (i.e., has a reference to, in this case) the value. At 610 the method ends, and the state of the cache is as follows:

| Address | Value |
| --- | --- |
| X | <1$^{st}$ value of X> |
| Y | <3$^{rd}$ value of Y> |
| | 00-<null> + 11-1:0002 |

FIGS. 4A and 4B illustrate just two of many different manners in which reserved cache lines are usable to store accounting bits. FIGS. 4C and 4D, for example, illustrate some additional ways to use reserved cache lines to track whether or not a processing unit has logged a cache line as well as reference values. Each of these examples are presented in the context of a simple shared cache that includes four active cache lines and different numbers of reserved cache lines, and in which the shared cache is shared by two processing units.

FIG. 4C illustrates an example shared cache 400c that is similar to the shared cache 400b of FIG. 4B, in which accounting bits for two or more cache lines are stored in each reserved cache line, except that one set of reference bits in shared cache 400c are used in connection with multiple sets of unit bits. Thus, a single set of reference bits is used in connection with storing reference values for multiple cache lines. This enables, for example, fewer reserved cache lines to be used to record a trace file of program execution using a processor cache storing reference bits. In FIG. 4C, for example, the shared cache 400c includes two reserved cache lines 403c, each of which stores accounting bits for two of the regular cache lines. The accounting bits in each of these cache lines are represented as "00+00" for two sets of unit bits (one for each cache line) along with "0:0000" for a reference value to be used in connection with those two sets of unit bits.

In this shared cache, when an existing reference value is updated by a processing unit, that existing reference value is added to the processing unit's trace so that it can be found later. For example, assume a simple cache, shared by two processing units, having with two regular cache lines and one reserved cache line, as follows:

| Address | Value |
|---------|-------|
| X | <$1^{st}$ value of X> |
| Y | <$1^{st}$ value of Y> |
| 00 + 00 - <null> | |

Now, if P0 reads from address Y, this is new information for P0. The first value of Y is logged in P0's trace, the unit bit for cache line Y and P0 is set, and the reference value is updated (in reference to P0 and a count) as follows:

| Address | Value |
|---------|-------|
| X | <$1^{st}$ value of X> |
| Y | <$1^{st}$ value of Y> |
| 00 + 10 - 0:0001 | |

Next, if P1 reads from address Y, this is new information for P1. Since P0 has already logged the value of Y, the reference to the value of Y in P0's trace (i.e., 0:0001) is logged in P1's trace, the unit bit for cache line Y and P1 is set, and the reference value remains unchanged, as follows:

| Address | Value |
|---------|-------|
| X | <$1^{st}$ value of X> |
| Y | <$1^{st}$ value of Y> |
| 00 + 11 - 0:0001 | |

Now, suppose P1 reads from address X. This is new information for P1, so the value should be logged on P1's trace. Normally, the reference value would also be updated, so that the value of X on P1's trace could be referenced later. However, now cache lines X and Y share the same reference value bits in the reserved cache line. Thus, P0's reference to the first value of Y would be lost if these bits were simply overwritten. Instead, the processor adds to P1's trace both (i) the $1^{st}$ value of X (as it normally would), as well as (ii) the current reference value in the reserved cache line (i.e., 0:0001, which references the first value of Y on P0's trace). The processor then updates the reference value in reference to P1 (in reference to P1 and a count). The state of the cache may then be:

| Address | Value |
|---------|-------|
| X | <$1^{st}$ value of X> |
| Y | <$1^{st}$ value of Y> |
| 00 + 11 - 1:0002 | |

If the reference to Y on P0's trace (0:0001) is needed later, it could be found by following reference value 1:0002 to P1's trace. Thus, reference values form chains through different processing unit's traces, which can be traversed later to obtain all needed values. Note that, as an optimization, if the back reference being recorded for a processing unit refers to that processing unit's own trace, that back reference can be omitted on the trace in some embodiments. However, due to ordering considerations across traces, cross-processor entries can typically not be omitted.

FIG. 4D illustrates another example shared cache 400d which uses a reserved cache line to store unit bits and, for each reserved cache line that stores unit bits, uses a separate cache line for each processor to store reference values for that processor. For example, in the shared cache 400d of FIG. 4D, there are four reserved cache lines 403d. Of these cache lines, one cache line (cache line 404) is used to store unit bits for each regular cache line, and two cache lines (cache lines 405) are used to store reference values for each of two processing units. In this shared cache 400d, each of cache lines 405 may store a count that is updated (e.g., incremented) each time its corresponding processing unit performs a read that is consumed by the processing unit, and also each time the processing unit performs a write that can be used to identify the value read or written by replaying the processing unit's trace. These reference values can then be used by in another processing unit's trace to reference those values.

Figure 4E:
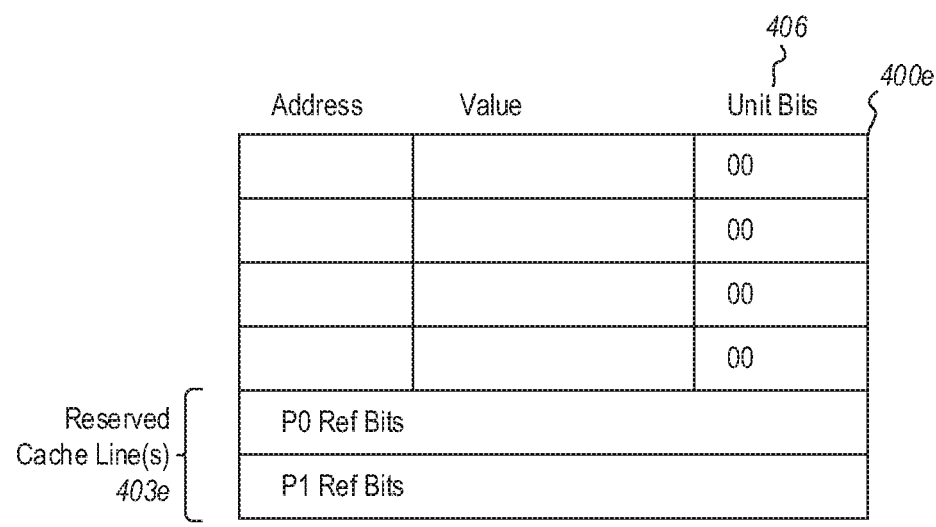
FIG. 4E illustrates an example hybrid shared cache that adds additional accounting bits to each cache line, and that also uses reserved cache lines for accounting bits.

FIG. 4E illustrates a hybrid shared cache 400e that adds additional accounting bits to each cache line, and that also uses reserved cache lines for accounting bits. For example, the hybrid shared cache 400e includes unit bits 406 that behave similar to the unit bits 304 of shared cache 300b, as well as reserved cache lines 403e that behave similar to the cache lines 405 of the shared cache 400d that are used to store reference values for each of two processing units.

Each of the foregoing cache embodiments may have their own benefits and drawbacks. For example, different cache types may be chosen to achieve differing processor design goals (e.g., microcode complexity vs. die space devoted to memory). In another example, different cache types may be chosen to balance the amount of reserved cache lines needed vs. complexity in replaying a trace later. In another example, different cache types may be chosen to balance the amount of reserved cache lines needed vs. trace file size or complexity. In another example, different cache types may be chosen to balance the amount of reserved cache lines needed vs. the rate in which thread concurrency issue arise. As one of ordinary skill in the art will recognize, there may be many more considerations for choosing a particular cache embodiment.

While the foregoing "accounting bit" embodiments have been described in the context of a shared processor cache that is shared between two or more processing units, many of the embodiments herein are applicable to private caches as well. For example, additional accounting bits in a private cache can assist with creating a trace for a thread, even though that private cache is used by a single processing unit. In some embodiments, for instance, each cache line of a private cache is associated with one or more additional bits (e.g., on the same cache line similar to FIG. 3A, or on a different reserved cache line similar to FIG. 4A) that are used to signify when a cache line has been modified by some entity other than the thread that is being traced. These accounting bits are then useful in circumstances when the processing unit is not entirely devoted to executing the thread.

To illustrate, a processing unit may not be entirely devoted to executing a thread being traced due to a context switch between user mode and kernel mode. Thus, for example, if a user mode thread is being traced, the cache lines it uses may be modified as a result of a context switch to kernel mode—during which time a kernel mode thread may write to those cache lines. Thus, one or more accounting bits could be used to signal when a cache line was modified during a kernel mode switch. In this example, when the thread being traced consumes a cache line, that thread may set an accounting bit associated with the cache line. Then, when some other entity (e.g., a kernel mode thread) writes to the cache line the processor may clear that bit.

Some additional embodiments include use of "dirty bits" to further reduce trace file size. For example, as part of recording a trace of a thread, it may be useful to record a copy of the entire memory contents of the thread. Often times, recording memory contents of a thread comprises recording only runtime memory of the thread (and not recording both memory containing executable code of the thread). For example, since most code does not change during execution of a thread, a trace file space savings can be achieved by omitting it from the trace. However, some programs dynamically modify their code at runtime. In order to efficiently capture these changes, some embodiments include use of a "dirty bit" on a page table.

In these embodiments, when code is read into a memory page, a bit (e.g., in a page table) associated with memory page is used to signal that page as being "clean." Then, if any portion of that memory page is written to at runtime, the bit is toggled to indicate the memory page is now "dirty." This "dirty" bit is then used during execution of the thread to reduce trace file size. In particular, if a portion of the memory page is brought into a cache line when the memory page is indicated as being clean, then that read into the cache is omitted from the trace file (since the value read can be obtained from the code of the program). Conversely, if a portion of the memory page is brought into a cache line when the memory page is indicated as being dirty, then that read into the cache is recorded to the trace file.

The foregoing can be extended to memory pages that store runtime data as opposed to code. For example, when a memory page is recorded to a trace file, the dirty bit associated with the memory page can be cleared to indicate that the memory page is clean. Then, subsequent reads from that memory page to the processor cache can be omitted from the trace file so long as the page remains marked "clean." However, whenever the memory page is written to, the dirty bit can be set, and subsequent reads from that memory to the processor cache can be logged to the trace.

In view of the foregoing, one or more embodiments include a computing device for facilitating recording a trace of program execution using a processor cache. For example, the computing device may comprise the computer system 101 and/or the processor(s) 102 of FIG. 1. The computing device comprises a plurality of processing units, such as processing units 102a, and a processor cache 102b which is shared by the plurality of processing units, and which is configured to cache data from a memory device, such as the system memory 103.

The processor cache includes a plurality of cache lines that each comprise at least (i) an address portion for storing a memory address of the memory device, and (ii) a value portion for storing a value associated with the memory address. For example, each processor cache of FIGS. 3A-4E includes an address portion and a value portion. The processor cache also includes a set of accounting bits, that include different pluralities of accounting bits. Each plurality of accounting bits is associated with a different cache line, and includes a different unit bit associated with a different one of the plurality of processing units. For example, the caches of FIGS. 3B-4E each include different example arrangements of accounting bits, including unit bits for each cache line that indicate whether a corresponding processor has logged or otherwise has knowledge of the value in the cache line. In some of these arrangements (e.g., FIGS. 3B, 3C, and 4E), each cache line also comprises its corresponding plurality of accounting bits. In other arrangements (e.g., FIGS. 4A-4D), the set of accounting bits is stored in one or more reserved cache lines of the processor cache.

The computing device includes stored control logic (e.g., computer-executable instructions stored in the data store and/or as part of microcode 104) that is configured to use the pluralities of accounting bits to indicate, for each cache line and for each processing unit, whether or not a trace file logs for the processing unit a current value stored in the value portion of the cache line. For example, FIGS. 5 and 6 illustrate flowcharts for recording a trace file of program execution using a processor cache, including use of unit bits.

In some embodiments, in connection with a read operation, the control logic may be configured to determine that a particular unit bit associated with a particular processing unit and a particular cache line has not been set (e.g., decision block 505 of FIG. 5 or 606 of FIG. 6). Then, based on the particular unit bit not being set, the processor 102 may log at least a value stored in the value portion of the particular cache line into the trace file on behalf of the particular processing unit (e.g., act 507a or 607a), and set the particular unit bit (e.g., act 507b or 607b). In some embodiments, a unit bit is cleared based on detecting of a write operation by a processing unit on a cache line. For example, the control logic may clear each unit bit in the plurality of accounting bits associated with a cache line being written to, except for the unit bit associated with the processing unit doing the writing (e.g., acts 509a and 509b or 611a and 611b).

In some embodiments, the plurality of accounting bits for at least one cache line also include reference bits for storing a reference value (e.g., FIGS. 3C and 4B-4E). In these embodiments, the stored control logic is configured to store some values on the trace file by reference. For example, FIG.

6 illustrates a flowchart for recording a trace file of program execution using a processor cache, including use of unit bits and reference bits.

In some embodiments that include reference bits, and in connection with a read operation, the control logic may determine that a particular unit bit associated with a particular processing unit and a particular cache line has not been set (e.g. decision block 605 of FIG. 6), and determine that a value stored in a value portion of the particular cache line has not already been logged by another processing unit (e.g., decision block 606). Then, based on the particular unit bit not being set, and based on the value having not already been logged by another processing unit, the processor 102 may log the value into the trace file (e.g., act 607*a*), set the particular unit bit (e.g., act 607*b*), and update the reference value for the particular cache line (e.g., act 607*c*). Later, when another processing unit reads the value from the particular cache line, the control logic may determine that the value stored in the value portion of the particular cache line has already been logged by another processing unit (e.g., decision block 606). Then, based on the particular unit bit not being set, and based on the value having already been logged by another processing unit, the processor 102 may log the reference value into the trace file (e.g., act 609*a*) and set the particular unit bit (e.g., act 609*b*). In some embodiments, a reference value is also updated based on detecting of a write operation by a processing unit on a cache line (e.g., act 611*c*).

One or more embodiments include a method for facilitating recording a trace file of program execution using a processor cache. The method is described in connection with the flowchart of FIG. 5. The method is implemented at a computing device (e.g., computer system 101 and/or processor(s) 102) that includes a plurality of processing units (e.g., processing units 102*a*) and the processor cache (e.g., shared cache 102*b*), which is shared by the plurality of processing units. The processor cache includes a plurality of cache lines that are each associated with a different plurality of accounting bits, each plurality of accounting bits including a different unit bit that is associated with a different one of the plurality of processing units (e.g., see the shared caches of FIGS. 3B-4E).

The method includes identifying an operation by a particular processing unit of the plurality of processing units on a particular cache line of the plurality of cache lines (e.g., act 501 in FIG. 5 or act 601 in FIG. 6). Based at least on identifying the operation, the method may include, when the operation comprises a read operation that is consumed by the particular processing unit (e.g., 'read' from decision block 502 or 602 and 'yes' from decision block 503 or 603), and when a particular unit bit for the particular processing unit in the plurality of accounting bits associated with the particular cache line is not set (e.g., 'no' from decision block 505 or 605), (i) causing at least the value portion of the particular cache line to be stored or referenced in the trace file (e.g., act 507*a* or act 607*a*), and (ii) setting the particular unit bit (e.g., act 507*b* or act 607*b*). Based at least on identifying the operation, the method may include, when the operation comprises a write operation (e.g., 'write' from decision block 502 or 602), clearing each unit bit in the plurality of accounting bits associated with the cache line that are associated with any processing unit other than the particular processing unit, and setting the particular unit bit associated with the particular processing unit (e.g., acts 509*a* and 509*b* or 611*a* and 611*b*).

In some embodiments, the method is implemented at a computing device in which the processor cache also includes at least one set of reference bits that store a reference value for the particular cache line (e.g., FIGS. 3C and 4B-4E). In these embodiments, when the plurality of accounting bits associated with the particular cache line indicate that no other processing unit has logged the value stored in the value portion of the particular cache line (e.g., 'no' from decision block 606), causing at least the value portion of the particular cache line to be stored or referenced in the trace file may include causing the value portion of the particular cache line to be stored in the trace file by causing the value to be stored in the trace file (e.g., act 607*a*). Additionally, in these embodiments, when the plurality of accounting bits associated with the particular cache line indicate that another processing unit has logged the value stored in the value portion of the particular cache line (e.g., 'yes' in decision block 606), causing the value portion of the particular cache line to be stored or referenced in the trace file may include causing the value portion of the particular cache line to be referenced in the trace file by causing the reference value to be stored in the trace file (e.g., act 609*a*). In these embodiments, the reference value for a cache line may be updated when a processing unit writes to the cache line (e.g., act 611*c*).

Facilitating Trace Recording Via Use of Processor Cache Way-Locking

As mentioned above, there are two general embodiments for identifying when a cache line has been consumed by an entity (e.g., thread) being traced. The first embodiment, described above, associates one or more "accounting bits" with each cache line, and uses those accounting bits to identify when a processing unit (and, by extension, an executing thread) has consumed the cache line. The second embodiment, utilizes associative caches, coupled with processor cache way-locking features of some processors to reserve a subset of the cache for the entity being traced, and then logs cache misses relating to that subset of the cache.

As a preliminary matter, it will be appreciated that a processor cache is generally much smaller than system memory (often by orders of magnitude), and thus there are usually far more memory locations in the system memory than there are lines in the cache. As such, each processor defines a mechanism for mapping multiple memory locations of system memory to particular line(s) in a cache. As mentioned briefly above, processors generally employ one of two general techniques: direct mapping and associative (or set-associative) mapping.

Figure 7A:
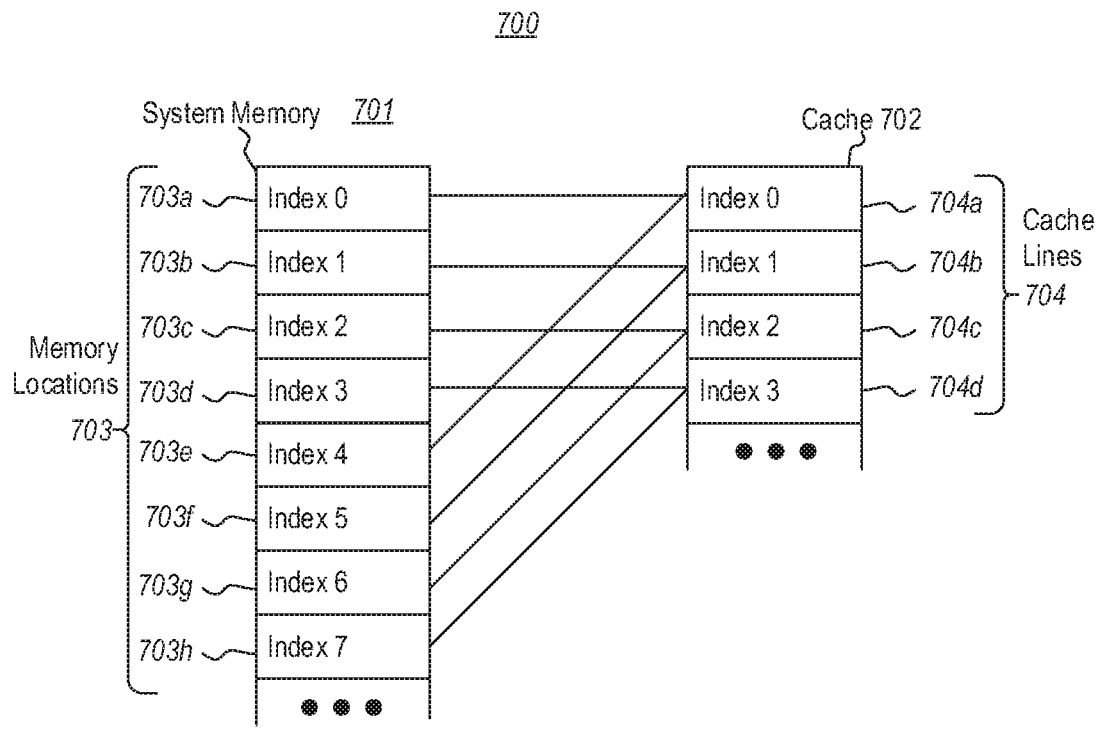
FIG. 7A illustrates an example of direct mapping in a cache.

FIG. 7A illustrates an example 700 of direct mapping. In example 700, different memory locations 703 in system memory 701 are mapped to just one line 704 in a cache 702, such that each memory location can only be cached into only one line in the cache 702. Thus, in the example, memory locations 703*a* and 703*e* (memory indexes 0 and 4) are mapped to cache line 704*a* (cache index 0), memory locations 703*b* and 703*f* (memory indexes 1 and 5) are mapped to cache line 704*b* (cache index 1), and so on.

Figure 7B:
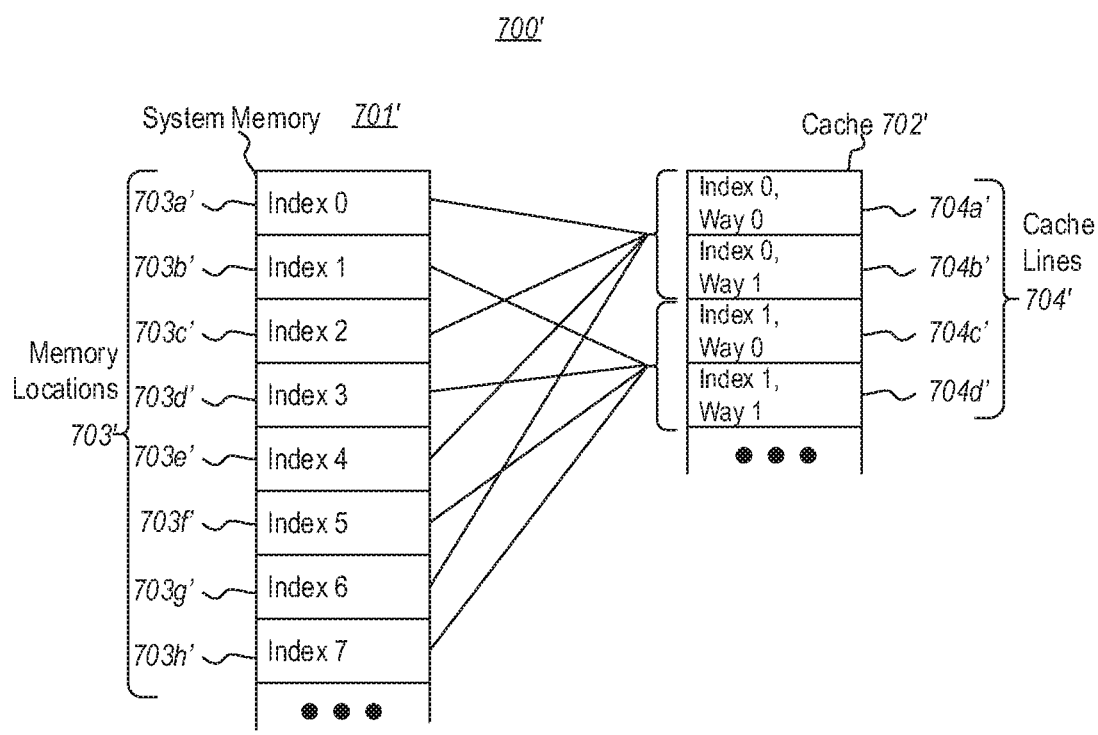
FIG. 7B illustrates an example of set-associative mapping in a cache.

With set-associative mapping, on the other hand, different locations in system memory can be cached to one of multiple lines in the cache. FIG. 7B illustrates an example 700' of set-associative mapping. Here, cache lines 704' of cache 702' are logically partitioned into different sets of two lines each, including a first set of two lines 704*a*' and 704*b*' (identified as index 0), and a second set of two lines 704*c*' and 704*d*' (identified as index 1). Each line in a set is identified as a different "way," such that line 704*a*' is identified by index 0, way 0, 704*b*' is identified by index 0, way 1, and so on. As further depicted, memory locations 703*a*', 703*c*', 703*e*', and 703*g*' (memory indexes 0, 2, 4, and 6) are mapped to index 0. As such, each of these locations in system memory can be cached to any cache line within the set at index 0 (i.e., lines 704a' and 704b'). The particular patterns of the depicted mappings are for illustrative and conceptual purposes only, and should not be interpreted as the only way in which memory indexes can be mapped to cache lines.

Set-associative caches are generally referred to as being N-way set-associated caches, where N is the number of "ways" in each set. Thus, the cache 702' of FIG. 7B would be referred to as a 2-way set-associative cache. Processors commonly implement N-way caches where N is a power of two (e.g., 2, 4, 8, etc.), with N values of 4 and 8 being commonly chosen (though the embodiments herein are not limited to any particular N-values or subsets of N-values). Notably, a 1-way set-associative cache is generally equivalent to a direct-mapped cache as shown in FIG. 7B, since each set contains only one cache line. Additionally, if N equals the number of lines in the cache, it is referred to as a fully associative cache, since it comprises a single set containing all lines in the cache. In fully associative caches any memory location can be cached to any line in the cache.

It is noted that FIGS. 7A and 7B represent a simplified view of system memory and caches, in order to illustrate general principles. For example, while FIGS. 7A and 7B map individual memory locations to cache lines, it will be appreciated that each line in a cache generally stores data relating to multiple addressable locations in system memory. Thus, in FIGS. 7A and 7B each location (703a-703h and 703a'-703h') in system memory (701, 701') may actually represent a plurality of addressable memory locations. Additionally, as alluded to previously, mappings may be between actual physical addresses in system memory 701/701' and lines in the cache 702/702', or may use an intermediary layer of virtual addresses.

Figure 8:
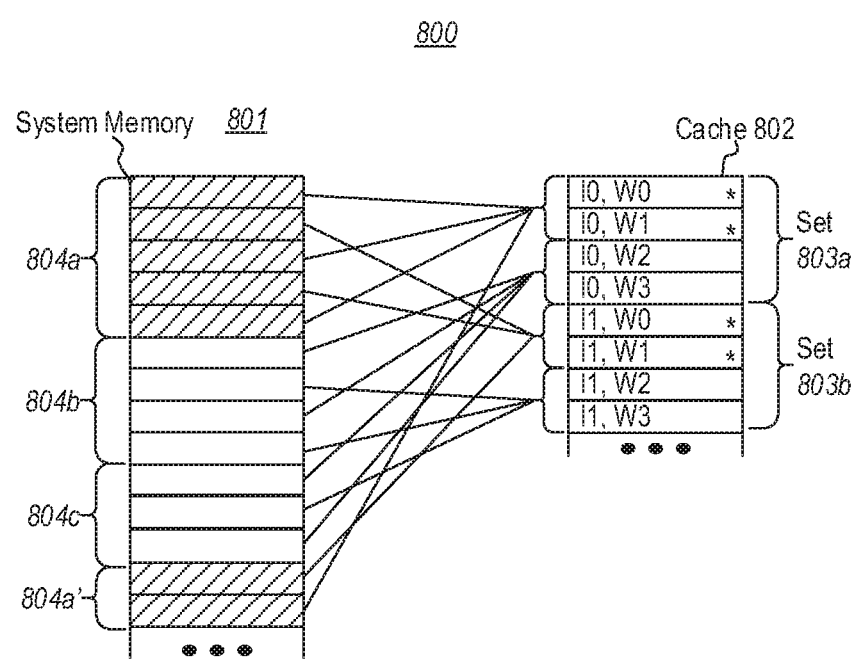
FIG. 8 illustrates expanded of a set-associative cache having reserved ways.

Embodiments herein utilize set-associative caches by implementing "way-locking," which locks or reserves certain ways in a cache for some purpose. In particular, the embodiments herein utilize way-locking to reserve one or more ways for the entity that is being traced, such that the locked/reserved ways are used exclusively for storing cache misses relating to execution of the entity that is being traced. Thus, referring back to FIG. 7, if "way 0" were locked for the traced entity, then cache lines 704a' and 704c' (i.e., index 0, way 0 and index 1, way 0) would be used exclusively for cache misses relating to execution of the trace entity, and the remaining cache lines would be used for all other cache misses. FIG. 8 illustrates an expanded example 800 that includes a 4-way set-associative cache 802 (showing two sets 803a and 803b, also identified as I0 and I0), and in which ways 0 and 1 (identified as W0 and W1) in each set are reserved/locked (as indicated by the asterisks) for handling cache misses only for the traced entity. The remaining ways (e.g., ways 2 and 3) are available generally for handling cache misses for all other entities. This division is for illustrative purposes only, and any division could be used (e.g., two reserved and 6 available generally, six reserved and two available generally, etc.).

FIG. 8 also illustrates a partial mapping of memory addresses in system memory 801 to lines of the cache 802. FIG. 8 utilizes a similar simplified view of system memory and caches was used above in connection with FIGS. 7A and 7B. FIG. 8 represents memory locations corresponding to three entities, including memory locations 804a and 804a' corresponding to memory space of the entity that is being traced, and memory locations 804b and 804c corresponding to memory space of two other entities. In FIG. 8, the memory locations 804a and 804a' corresponding to the entity that is being traced are mapped to the locked ways (i.e., ways 0 and 1), and memory locations corresponding to the other entities are mapped to the other general use ways (i.e., ways 2 and 3). Again, this mapping is for illustrative and conceptual purposes only, and it merely indicates that different memory address of the traced entity's memory space are mapped to the locked/reserved ways, and that memory addresses used by entities other than that traced entity are mapped to other non-reserved general-purpose ways, without being limited to any particular mapping pattern.

In some embodiments, the memory addresses corresponding to the memory space of the entity that is being traced are identified in reference to a particular memory address in system memory 801 corresponding to the root of a page table data structure for the traced entity (which contains mappings between physical memory addresses virtual memory addresses seen by the traced entity). Thus, this particular memory address, and the page table(s) it identifies, are used by the processor to determine whether a given cache miss should be stored in the reserved/locked ways, or stored in the general-purpose ways.

In some embodiments, at least a portion of the memory address pointing to the traced entity's page table is stored in a processor register, such as a context register, which is then referred to when a cache miss occurs in order to determine whether or not the cache miss applies to the traced entity's memory space. It will be appreciated by one of ordinary skill in the art that, in many architectures, page tables are stored at physical memory page boundaries. Thus, a context register may need only store the "high" bits of the memory address.

While locking ways for exclusive use by a particular entity can increase the predictability and performance of execution of that entity, it can also be applied to efficient tracing of execution of the traced entity, as well as reduced trace file sizes as compared to other techniques. In particular, it is noted that since the locked/reserved way(s) are used exclusively for the traced entity, a full record of memory accesses by the traced entity can be obtained by recording in the trace file the memory values cached into the reserved way(s). Since memory values relating to cache misses by any entity other than the traced entity cannot generally be cached in the locked/reserved way(s), other entities cannot interfere with (pollute) the data in the cached way(s), with the possible exception of the operating system kernel 104b, as discussed below. Accordingly, through use of way-locking, there may be no need to track whether a memory access by another entity has invalidated the traced entity's knowledge of a cache line (e.g., by using accounting bits, as described above).

As mentioned briefly above, in some environments the operating system kernel 104b may potentially pollute locked/reserved ways, and this needs to be handled. Handling kernel pollution of locked ways can involve (i) tracking when the kernel 104b uses locked ways, or (ii) preventing the kernel 104b from using the locked ways altogether.

An embodiment for tracking when the kernel 104b has used a locked way involves use a context register identifying the root of the page table of the entity being traced (to identify that the cache miss relates to execution of the traced entity), together with identifying the ring mode of the processor 102 at the time of the cache miss (i.e., whether the processor 102 is executing under user mode or kernel mode at the time of the cache miss). In this embodiment, cache misses are logged to the trace file(s) 104d when the context register identifies the root of the page table of the entity being traced, and when the processor 102 is executing in user mode. On the other hand, cache misses are not logged (or are logged but may be flagged as being cache misses caused by the kernel 104*b*) when the context register identifies the root of the page table of the entity being traced, and when the processor 102 is executing in kernel mode.

As mentioned above, other embodiments prevent the kernel 104*b* from using locked ways altogether. In one embodiment, the processor 102 uses the context register identifying the root of the page table of the entity being traced, together with the ring mode of the processor 102 at the time of the cache miss, to send cache misses relating to the kernel 104*b* to the general-purpose ways instead of the locked ways. For example, any cache misses that occurs when the context register identifies the traced entity, but the ring mode is kernel mode, are sent to the non-locked ways.

Another embodiment leverages page table groups (e.g., multilevel page tables), and involves switching the value of the context register when transitioning between user mode and kernel mode. In particular, when switching from user mode to kernel mode while executing a traced entity, the kernel 104*b* can switch the value of the context register from a value corresponding to the root of the traced entity's page table, to a value pointing to another page table in the same page table group as the traced entity's page table. In this way, the value of the context register is different when executing in kernel mode than when executing the traced entity in user mode, and the kernel mode cache misses are therefore stored in the general-purpose ways instead of the locked ways.

Figure 9:
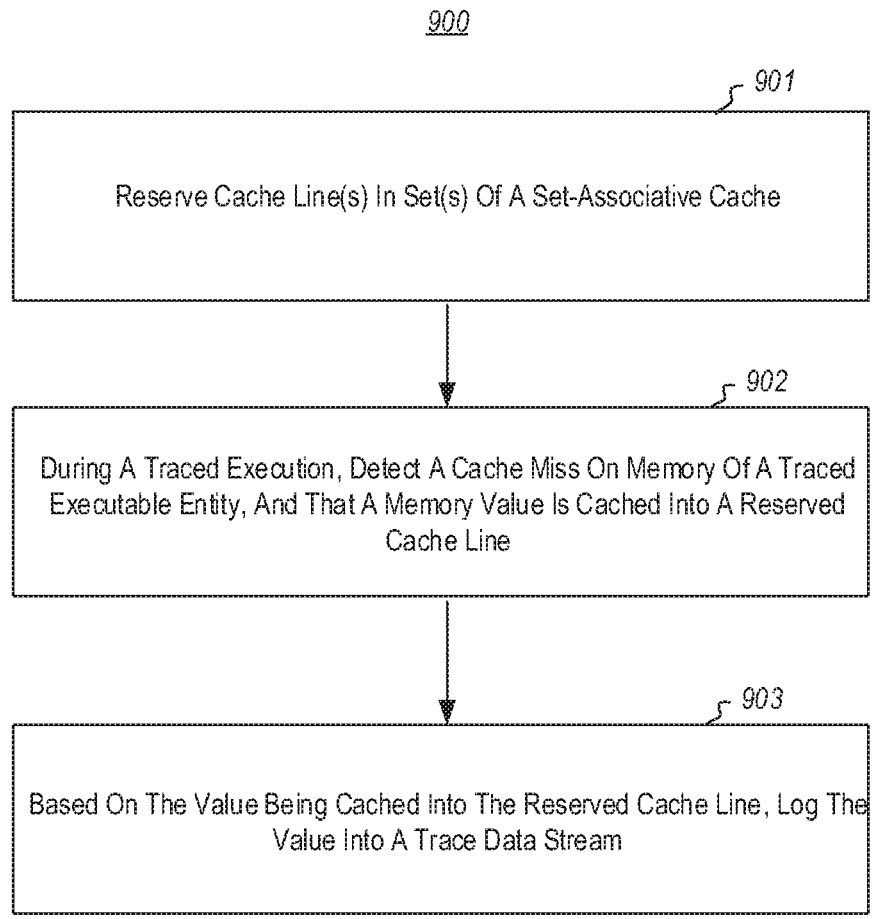
FIG. 9 illustrates a flowchart of an example method for facilitating recording a trace of code execution using a set-associative processor cache.

FIG. 9 illustrates a flowchart of a method 900 for facilitating recording a trace of code execution using a set-associative processor cache. FIG. 9 is described in connection with the computer architecture 100 of FIG. 1 and the example 800 of FIG. 8. In general, the method 900 of FIG. 9 is performed in a computing environment that comprises one or more processing units that are associated with at least one set-associative processor cache that includes a plurality of sets of cache lines, and in which each set comprises two or more different cache lines. For example, method 900 may be performed at computer system 101, in which the shared cache 102*b* is an N-way set-associative cache where N is two or greater, that caches data from system memory 103. The method 900 may be performed based on computer-executable instructions stored in the data store 104 (e.g., tracer 104*a*) and/or in microcode 102*c*.

As depicted, method 900 includes an act 901 of reserving cache line(s) in set(s) of a set-associative cache. Act 901 can comprise reserving/locking one or more cache lines in one or more of the plurality of sets of cache lines for caching only locations in a system memory that are allocated to a particular executable entity. For example, the tracer 104 may request (e.g., via operating system kernel 104*b*) that the processor(s) 102 reserve/lock one or more ways in the shared cache 102*b* for exclusive use to cache data relating to execution of application 104*c* (e.g., application data code 103*a* and/or application runtime data 103*b*), which is being traced by the tracer 104*a*. The request may be made by way of a way-lock request specifying one or more way numbers and/or index/way number combinations. Referring to FIG. 8, for example, ways 0-3 from sets 803*a*, 803*b*, 803*c*, etc. in cache 802 may be reserved for caching the data relating to execution of application 104*c*.

In some embodiments, act 901 may comprise locking the cache lines based on a memory address corresponding to a page table for a memory space of the particular executable entity. For example, as mentioned above, there may be a memory address that marks a location in the system memory 801 corresponding to a page table for a memory space of a traced executable entity. The processor(s) 102 may store at least a portion of this memory address in a processor register (e.g., a context register).

Method 900 also includes an act 902 of, during a traced execution, detecting a cache miss on memory of a traced executable entity, and that a memory value is cache into a reserved cache line. Act 902 can comprise, during a traced execution of the particular executable entity, detecting that a cache miss has occurred on a location in the system memory that is allocated to a particular executable entity, and that a value at the location of system memory has been, or is to be, cached into one of the locked cache lines. For example, one or more of the tracer 104*a* or the microcode 102*c* may detect a cache miss on an address in the application runtime data 103*b* in system memory 103. As such, data stored at this address is cached in a reserved line in the shared cache 102*b*. Referring to FIG. 8 as an example, a memory access by application 104*c* may cause a cache miss on an address corresponding to the traced entity (e.g., an address in addresses 804*a* and 804*a*'). As such, a value stored at this address is stored in one of the reserved cache lines.

In some embodiments, detecting the cache miss is performed in reference to a processor register (context register) that stores a portion of a memory address corresponding to a page table for a memory space of the particular executable entity.

Method 900 also includes an act 903 of, based on the value being cached into the reserved cache line, logging the value into a trace data stream. Act 903 can comprise, based at least on the value at the location of system memory being cached into one of the locked cache lines, logging into a trace data stream at least a portion of the value at the location of system memory being cached into the one of the locked cache lines. For example, the tracer 104*a* may store the value cached in act 902 into a data stream in trace file 104*d*. Act 903 may also comprise logging least a portion an address of the memory location cached in act 902.

Some embodiments may comprise a computing device, such as a processor 102, having control logic configured to operate in connection with a tracer 104*a*. In these embodiments the computing device can comprise one or more processing units (e.g., processing units 102*a*) and a processor cache that has a plurality of cache lines (e.g., shared cache 102*b*). The computing device can comprise stored control logic (e.g., microcode 102*c*) that facilitates recording a trace of code execution using a processor cache.

The stored control logic may be configured to group the plurality cache lines into a plurality of sets of cache lines, each set comprising two or more different cache lines. For example, the microcode 102*c* may group lines of the shared cache 102*b* in an N-way set-associative manner, with N equal to or grater than two, such as those illustrated in FIGS. 7B and 8.

The stored control logic may also be configured to, based upon a request, lock one or more cache lines in one or more of the plurality of sets of cache lines for caching only locations in system memory associated with a traced executable entity. For example, the microcode 102*c* may be configured to lock or reserve one or more ways in the set-associative cache 102*b*, such as reserving four of eight ways as shown in FIG. 8 as an example. By locking these ways, they are used exclusively to store cache misses for reads on memory relating to a particularly-defined executable entity. As discussed above, the locations in system memory associated with the traced executable entity may be identified based on one or more of a memory address identifying a page table of the traced executable entity, an execution context (e.g., user mode or kernel mode), a page table group, etc.

The stored control logic may also be configured to detect a cache miss on a particular location in the system memory that is identified based upon the memory address associated with the traced executable entity. For example, the microcode 102c may be configured to detect a cache miss based on at least a portion of an address that corresponds to a page table for a memory space of the particularly-defined executable entity.

The stored control logic may also be configured to, as a result of detecting the cache miss, cache a value at the particular location in the system memory and initiate logging of the value at the particular location in the system memory into a log file associated with tracing of the traced executable entity. For example, the microcode 102c may be cache a value at the memory location that was the subject of the cache miss in an appropriate reserved cache location, and report this to the tracer 104a for logging in trace file 104d.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing device for facilitating recording a trace of code execution using a set-associative processor cache, the computing device comprising:
    one or more processing units associated with at least one set-associative processor cache that includes a plurality of sets of cache lines, each set comprising two or more different cache lines;
    system memory; and
    one or more computer-readable media having stored thereon computer-executable instructions that are executable by the one or more processing units to cause the computing device to perform at least the following:
       reserve one or more cache lines in one or more of the plurality of sets of cache lines for caching only locations in the system memory that are allocated to a particular executable entity;
       during a traced execution of the particular executable entity, detect that a cache miss has occurred on a location in the system memory that is allocated to a particular executable entity, and that a value at the location of system memory has been, or is to be, cached into one of the reserved cache lines; and
       based at least on the value at the location of system memory being cached into one of the reserved cache lines, log into a trace data stream at least a portion of the value at the location of system memory being cached into the one of the reserved cache lines.

2. The computing device of claim 1, wherein locations in the system memory that are allocated to a particular executable entity are identified based at least on a memory address corresponding to a page table for a memory space of the particular executable entity.

3. The computing device of claim 2, wherein at least a portion of the memory address is stored in a processor register.

4. The computing device of claim 3, wherein the at least a portion of the memory address stored in the processor register is used by the computing device to detect that the cache miss has occurred on the location in the system memory that is allocated to a particular executable entity.

5. The computing device of claim 1, wherein reserving one or more cache lines in one or more of the plurality of sets of cache lines comprises reserving one or more cache lines in each of the plurality of sets of cache lines.

6. The computing device of claim 1, wherein reserving one or more cache lines in one or more of the plurality of sets of cache lines comprises reserving the one or more cache lines based on way number.

7. The computing device of claim 1, wherein reserving one or more cache lines in one or more of the plurality of sets of cache lines comprises requesting a way-lock of the one or more processing units.

8. The computing device of claim 1, wherein logging into the trace data stream at least a portion of the value at the location of system memory being cached into the one of the reserved cache lines also comprises logging at least a portion of an address of the location in the system memory.

9. A method, implemented at a computing device that includes one or more processing units associated with at least one set-associative processor cache that includes a plurality of sets of cache lines, each set comprising two or more different cache lines, for facilitating recording a trace of code execution using a set-associative processor cache, the method comprising:
    locking one or more cache lines in one or more of the plurality of sets of cache lines for caching only locations in a system memory that are allocated to a particular executable entity;
    during a traced execution of the particular executable entity, detecting that a cache miss has occurred on a location in the system memory that is allocated to a particular executable entity, and that a value at the location of system memory has been, or is to be, cached into one of the locked cache lines; and
    based at least on the value at the location of system memory being cached into one of the locked cache lines, logging into a trace data stream at least a portion of the value at the location of system memory being cached into the one of the locked cache lines.

10. The method of claim 9, wherein locations in the system memory that are allocated to a particular executable entity are identified based at least on a memory address corresponding to a page table for a memory space of the particular executable entity.

11. The method of claim 10, wherein one or more portions of the memory address are stored in a processor register.

12. The method of claim 11, wherein the one or more portions of the memory address are stored in the processor register are used by the computing device to detect that the cache miss has occurred on the location in the system memory that is allocated to a particular executable entity.

13. The method of claim 9, wherein locking one or more cache lines in one or more of the plurality of sets of cache lines comprises locking one or more cache lines in each of the plurality of sets of cache lines.

14. The method of claim 9, wherein locking one or more cache lines in one or more of the plurality of sets of cache lines comprises locking the one or more cache lines based on way number.

15. The method of claim 9, wherein locking one or more cache lines in one or more of the plurality of sets of cache lines comprises requesting a way-lock of the one or more processing units.

16. The method of claim 9, wherein logging into the trace data stream at least a portion of the value at the location of system memory being cached into the one of the locked cache lines also comprises logging at least a portion of an address of the location in the system memory.

17. A computing device, comprising:
one or more processing units;
a processor cache that includes a plurality of cache lines; and
stored control logic that is configured to:
group the plurality cache lines into a plurality of sets of cache lines, each set comprising two or more different cache lines;
based upon a request, lock one or more cache lines in one or more of the plurality of sets of cache lines for caching only locations in system memory that are identified based upon a memory address associated with a traced executable entity;
detect a cache miss on a particular location in the system memory that is identified based upon the memory address associated with the traced executable entity; and
as a result of detecting the cache miss,
cache a value at the particular location in the system memory; and
initiate logging of the value at the particular location in the system memory into a log file associated with tracing of the traced executable entity.

18. The computing device of claim 17, wherein detecting the cache miss on the particular location in the system memory that is identified based upon the memory address associated with the traced executable entity comprises comparing an address of the particular location in the system memory to a register containing at least a portion of the memory address associated with the traced executable entity.

19. The computing device of claim 17, wherein initiating logging of the value at the particular location in the system memory into the log file associated with tracing of the traced executable entity comprises sending a message to a debugging application.

20. The computing device of claim 17, wherein locking the one or more cache lines comprise performing a way-locking operation.

* * * * *